(12) United States Patent
Noguchi et al.

(10) Patent No.: US 8,498,483 B2
(45) Date of Patent: Jul. 30, 2013

(54) IMAGE PROCESSING APPARATUS, IMAGE PROCESSING METHOD, AND COMPUTER READABLE MEDIUM

(75) Inventors: Yukinori Noguchi, Kanagawa (JP); Hirokazu Kameyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 620 days.

(21) Appl. No.: 12/720,311

(22) Filed: Mar. 9, 2010

(65) Prior Publication Data

US 2010/0158398 A1    Jun. 24, 2010

Related U.S. Application Data

(63) Continuation of application No. PCT/JP2008/066370, filed on Sep. 4, 2008.

(30) Foreign Application Priority Data

Sep. 10, 2007  (JP) ................................ 2007-234758
Jun. 26, 2008  (JP) ................................ 2008-167827

(51) Int. Cl.
*G06K 9/00*        (2006.01)
*G06K 9/36*        (2006.01)

(52) U.S. Cl.
USPC ............................ 382/181; 382/232; 382/162

(58) Field of Classification Search
USPC .................. 382/162–175, 181–231, 232–253
See application file for complete search history.

(56) References Cited

U.S. PATENT DOCUMENTS

| 6,021,214 A * | 2/2000 | Evans et al. .................... 382/141 |
| 6,400,768 B1 | 6/2002 | Nagumo et al. |
| 2006/0088101 A1 | 4/2006 | Han et al. |
| 2006/0280380 A1 | 12/2006 | Li |
| 2007/0071104 A1* | 3/2007 | Kondo ...................... 375/240.21 |
| 2007/0133675 A1 | 6/2007 | Honda et al. |

FOREIGN PATENT DOCUMENTS

| JP | 5-95541 A | 4/1993 |
| JP | 7-288806 A | 10/1995 |
| JP | 11-41558 A | 2/1999 |
| JP | 2000-13790 | 1/2000 |
| JP | 2004-88615 A | 3/2004 |
| JP | 2005-109757 A | 4/2005 |
| JP | 2005-142654 A | 6/2005 |

(Continued)

OTHER PUBLICATIONS

International Search Report (Dec. 19, 2008).

(Continued)

*Primary Examiner* — Alex Liew
(74) *Attorney, Agent, or Firm* — Birch, Stewart, Kolasch & Birch, LLP

(57) ABSTRACT

Provided is an image processing apparatus, including a characteristic region detecting section that detects a characteristic region from an input image; an image generating section that generates, from the input image, a low-quality image, which is of lower quality than the input image, and a characteristic region image, which is of higher quality than the low-quality image at least at the characteristic region; a difference processing section that generates a characteristic region difference image indicating a difference between an image of the characteristic region in the characteristic region image and an image of the characteristic region in the low-quality image; and an encoding section that encodes the characteristic region difference image and the low-quality image.

16 Claims, 9 Drawing Sheets

FOREIGN PATENT DOCUMENTS

| | | |
|---|---|---|
| JP | 2005-341076 A | 12/2005 |
| JP | 2006-121701 | 5/2006 |
| JP | 2006-350498 A | 12/2006 |
| JP | 2007-96709 A | 4/2007 |
| JP | 2007-174568 A | 7/2007 |
| JP | 2008-78641 | 4/2008 |
| JP | 2008-78836 | 4/2008 |
| JP | 2008-91562 | 4/2008 |
| JP | 2008-98600 | 4/2008 |
| WO | 98/21694 A1 | 5/1998 |

OTHER PUBLICATIONS

JP Office Action issued in corresponding JP Application No. 2008-167827 dated Dec. 25, 2012.

* cited by examiner

IMAGE PROCESSING APPARATUS, IMAGE PROCESSING METHOD, AND COMPUTER READABLE MEDIUM

CROSS REFERENCE TO RELATED APPLICATION

This is a continuation application of PCT/JP2008/066370 filed on Sep. 4, 2008 which claims priority from a Japanese Patent Applications
No. 2007-234758 filed on Sep. 10, 2007
No. 2008-167827 filed on Jun. 26, 2008
the contents of which are incorporated herein by reference. This patent application incorporates herein by reference the contents of Japanese Patent Applications No. 2008-078636 filed on Mar. 25, 2008, No. 2008-078641 filed on Mar. 25, 2008, No. 2008-091562 filed on Mar. 31, 2008, and No. 2008-098600 filed on Apr. 4, 2008.

BACKGROUND

1. Technical Field

The present invention relates to an image processing apparatus, an image processing method, and a computer readable medium. In particular, the present invention relates to an image processing apparatus and an image processing method for processing images, and a computer readable medium for the image processing apparatus.

2. Description of the Related Art

Japanese Patent Application Publication No. 2005-142654 discloses an image transmitting apparatus that encodes a low resolution base layer obtained by compressing a high resolution input image, computes a region map indicating partial regions during the encoding, and decodes the input image and the encoded image of the base layer. This image transmitting apparatus then divides an enlarged layer, which is a difference image between the input image and the image obtained by enlarging the encoded base layer image, after being decoded, to have a resolution equal to that of the input image, according to the region map and performs intra-frame encoding on each partial region. Japanese Patent Application Publication No. 2007-96709 discloses an image processing method that involves obtaining a motion amount between a first low resolution image and a second low resolution image, generating a motion-compensated image by using the motion amount to compensate the second high resolution image, and setting this motion-compensated image as the first high resolution image corresponding to the first low resolution image.

Since the invention disclosed in Japanese Patent Application Publication No. 2005-142654 divides the image data of the regions of interests when sending this data, a special image processing apparatus corresponding to the dividing process is necessary to display the encoded image. The invention disclosed in Japanese Patent Application Publication No. 2007-96709 cannot set the region of interest to an appropriate resolution.

SUMMARY

Therefore, it is an object of an aspect of the innovations herein to provide an image processing apparatus, an image processing method and a computer readable medium which are capable of overcoming the above drawbacks accompanying the related art. The above and other objects can be achieved by combinations described in the independent claims. The dependent claims define further advantageous and exemplary combinations of the innovations herein.

According to a first aspect of the invention, one exemplary image processing apparatus may include a characteristic region detecting section that detects a characteristic region from an input image; an image generating section that generates, from the input image, a low-quality image, which is of lower quality than the input image, and a characteristic region image, which is of higher quality than the low-quality image at least at the characteristic region; a difference processing section that generates a characteristic region difference image indicating a difference between an image of the characteristic region in the characteristic region image and an image of the characteristic region in the low-quality image; and an encoding section that encodes the characteristic region difference image and the low-quality image.

The image generating section may generate the low-quality image having decreased resolution from the input image, and the difference processing section may generate the characteristic region difference image between the image of the characteristic region in the characteristic region image and an enlarged image of the characteristic region in the low-quality image. The difference processing section may generate the characteristic region difference image having a spatial frequency component in the characteristic region and a spatial frequency component with a decreased data amount in a region other than the characteristic region, the spatial frequency component being obtained by converting the difference between the enlarged image and the characteristic region image into a spatial frequency domain.

The characteristic region detecting section may detect a plurality of characteristic regions having different characteristic types, from the input image, and the image generating section may generate, from the input image, one characteristic region image by decreasing the resolution in the characteristic region containing one type of characteristic and another characteristic region image containing another type of characteristic, the other characteristic region having resolution higher than the one characteristic region image at the characteristic region. The difference processing section may generate (i) the characteristic region difference image in which the characteristic region containing the one type of characteristic has the spatial frequency component and the region other than the characteristic region containing the one type of characteristic has the spatial frequency component with a decreased data amount, the spatial frequency component being obtained by converting the difference between the enlarged image and the one characteristic image into the spatial frequency domain and (ii) an inter-characteristic region difference image in which the characteristic region containing the other type of characteristic has a spatial frequency component and the region other than the characteristic region having the other type of characteristic has the spatial frequency component with a decreased data amount, the spatial frequency component being obtained by converting, into the spatial frequency domain, the difference between the other characteristic region image and an enlarged image of the other characteristic region image in which the characteristic region is enlarged. The encoding section may encode the characteristic region difference image, the inter-characteristic region difference image, and the low-quality image.

The characteristic region detecting section may detect the plurality of characteristic regions having different characteristic types, from among a plurality of moving image constituent images included in a moving image serving as the input image, and the image generating section may generate, from each moving image constituent image, (i) one characteristic region image by decreasing the resolution at the characteristic region containing one type of characteristic and (ii) another characteristic region image having a higher resolution than the one characteristic region at the characteristic region containing another type of characteristic. The difference processing section may generate a plurality of characteristic region difference images and a plurality of inter-characteristic region difference images from the plurality of characteristic region images generated by the image generating section from the plurality of moving image constituent images, and the encoding section may encode the characteristic region difference moving image including the plurality of characteristic region difference images, the inter-characteristic region difference moving image including the plurality of inter-characteristic region difference images, and the low quality moving image including the plurality of low-quality images.

According to a second aspect of the invention, one exemplary image processing method may include the steps of detecting a characteristic region from an input image; generating, from the input image, a low-quality image which is of lower quality than the input image, and a characteristic region image which is of higher quality than the low-quality image at least at the characteristic region, the low-quality image having decreased resolution; generating a characteristic region difference image indicating a difference between an image of the characteristic region in the characteristic region image and an enlarged image of the characteristic region in the low-quality image; and encoding the characteristic region difference image and the low-quality image. The step of generating a characteristic region difference image comprises a step of generating the characteristic region difference image having a spatial frequency component in the characteristic region and a spatial frequency component with a decreased data amount in a region other than the characteristic region, the spatial frequency component being obtained by converting the difference between the enlarged image and the characteristic region image into a spatial frequency domain.

According to a third aspect of the invention, one exemplary computer readable medium storing therein a program for an image processing apparatus may be provided. The program causes the image processing apparatus to function as a characteristic region detecting section that detects a characteristic region from an input image; an image generating section that generates, from the input image, a low-quality image which is of lower quality than the input image, and a characteristic region image which is of higher quality than the low-quality image at least at the characteristic region, the low-quality image having decreased resolution; a difference processing section that generates a characteristic region difference image indicating a difference between an image of the characteristic region in the characteristic region image and an enlarged image of the characteristic region in the low-quality image; and an encoding section that encodes the characteristic region difference image and the low-quality image. The difference processing section may generate the characteristic region difference image having a spatial frequency component in the characteristic region and a spatial frequency component with a decreased data amount in a region other than the characteristic region, the spatial frequency component being obtained by converting the difference between the enlarged image and the characteristic region image into a spatial frequency domain.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Figure 1:
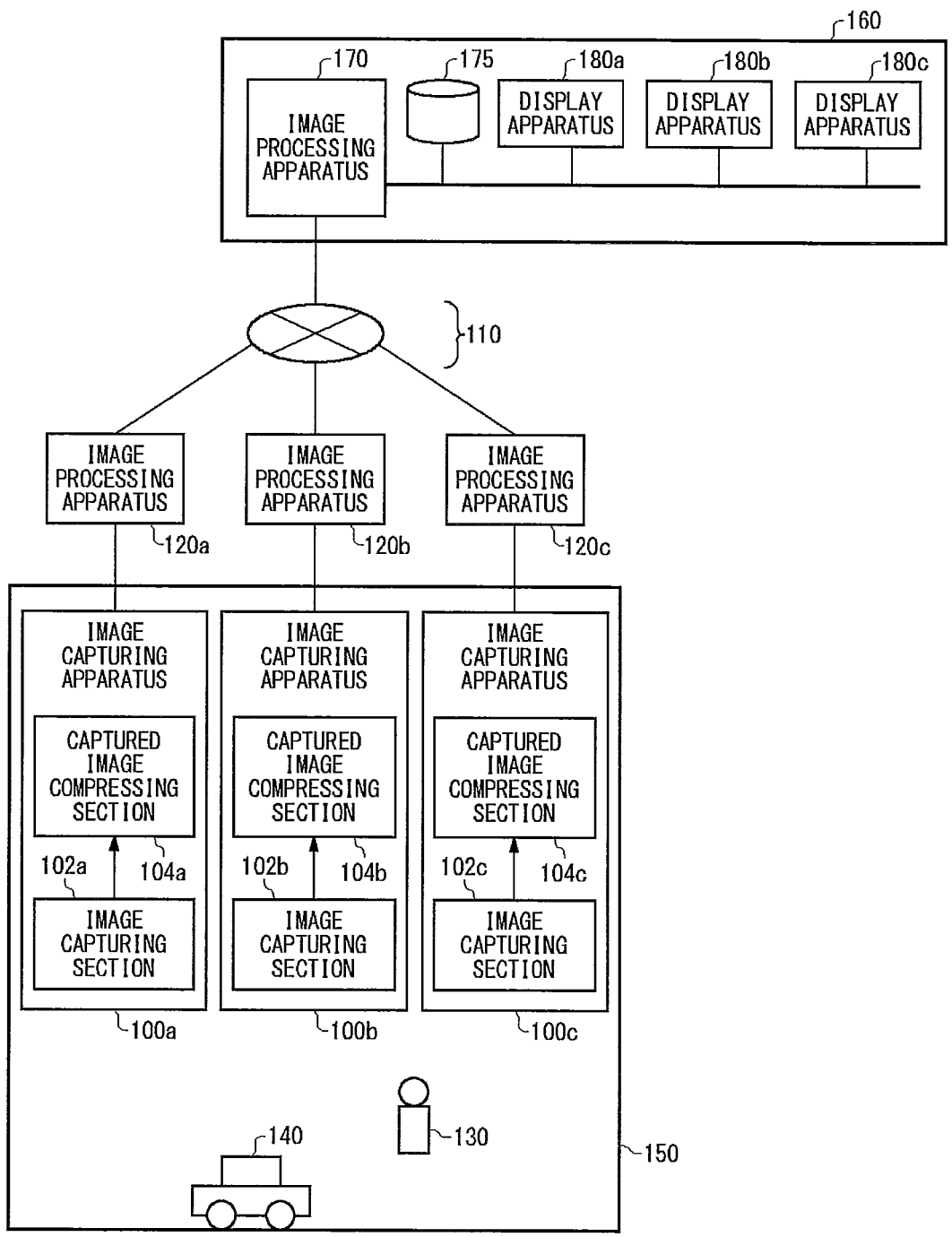
FIG. 1 shows one example of an image processing system 10 according to an embodiment.

FIG. 1 shows one example of an image processing system 10 according to an embodiment. The image processing system 10 aims to reduce the data amount of an image while keeping the image quality of a characteristic object high.

The image processing system 10 includes a plurality of image capturing apparatuses 100a to 100c (hereinafter collectively referred to as image capturing apparatuses 100) that capture images of a monitored area 150, a plurality of image processing apparatuses 120a to 120c (hereinafter collectively referred to as image processing apparatuses 120) that process images, an image processing apparatus 170, a communication network 110, and a plurality of display apparatuses 180a to 180c (hereinafter collectively referred to as display apparatuses 180).

The image processing apparatus 120a is connected to the image capturing apparatus 100a. The image processing apparatus 120b is connected to the image capturing apparatus 100b. The image processing apparatus 120c is connected to the image capturing apparatus 100c. The image processing apparatus 170 and the display apparatuses 180 are provided in an area 160 different from the monitored area 150.

The operations of the image capturing apparatus 100a, the image processing apparatus 120a, the image processing apparatus 170, and the display apparatus 180a will be explained below. The image capturing apparatus 100a captures an image of the monitored area 150, encodes the acquired captured image with MPEG encoding to generate captured moving image data, and outputs the data to the image processing apparatus 120a, to which the image capturing apparatus 100a is connected.

Specifically, the image capturing apparatus 100a includes an image capturing section 102a and a captured moving image compressing section 104a. The image capturing section 102a captures an image of the monitored area 150, and generates a plurality of moving image constituent images included in the captured moving image. The image capturing section 102a may generate moving image constituent images in RAW format. The captured moving image compressing section 104a performs color estimation (a coinciding process) on the RAW-format moving image constituent images generated by the image capturing section 102a and compresses the captured moving image including a plurality of moving image constituent images resulting from the color estimation (coinciding process) according to MPEG encoding or the like, thereby generating captured moving image data.

The image processing apparatus 120a acquires the captured moving image data generated by the image capturing apparatus 100a. The image processing apparatuses 120 generate the captured moving image by decoding the captured moving image data acquired from the image capturing apparatuses 100, and detect, from the generated captured moving image, a plurality of characteristic regions including characteristics of different categories from each other, including, for example, a person 130, a moving object 140 such as a car, etc. The image processing apparatus 120a generates a plurality of characteristic region moving images from the captured moving image, by generating a plurality of moving images, in each of which the characteristic region of a corresponding category of characteristic is superior in image quality to the rest of the region in the moving image. The image processing apparatus 120a generates a low-quality moving image, which includes regions other than the characteristic regions with a lower image quality than that of the characteristic region moving images.

The image processing apparatus 120a encodes the plurality of generated characteristic region moving images and the generated low-quality moving image, to generate a plurality of characteristic region moving image data, and low-quality moving image data. At the same time, the image processing apparatus 120a layers the plurality of characteristic region moving image data obtained by encoding onto the low-quality moving image data likewise obtained by encoding, and sends each associated data to the image processing apparatus 170 via the communication network 110.

The image processing apparatus 170 decodes each of the plurality of characteristic region moving image data and the low-quality moving image data sent from the image processing apparatus 120a to obtain the plurality of characteristic region moving images and the low-quality moving image. The image processing apparatus 170 combines the plurality of characteristic region moving images and the low-quality moving image to generate a composite moving image, and supplies the generated composite moving image to the display apparatus 180a. The display apparatus 180a displays the moving image supplied from the image processing apparatus 170.

The image processing apparatus 170 may record the generated composite moving image or the captured moving image data acquired from the image processing apparatus 120a in the image DB 175. The image processing apparatus 170 may supply the composite moving image recorded in the image DB 175 to the display apparatus 180a at a request from the display apparatus 180a. The image processing apparatus 170 may decode the captured moving image data recorded in the image DB 175 in the above-described decoding manner, and supply it to the display apparatus 180a at a request from the display apparatus 180a. The image DB 175 may include, for example, a non-volatile recording medium such as a hard disk, and record the composite moving image supplied from the image processing apparatus 170 in the recording medium.

The image capturing apparatus 100b and the image capturing apparatus 100c include a component that has the same function as the component included in the image capturing section 102a. The function and operation of the image capturing apparatus 100b and image capturing apparatus 100c will not be explained, because they are identical with those of the image capturing apparatus 100a, except that the image capturing apparatus 100b and image capturing apparatus 100c supply captured moving image data to the image processing apparatus 120b and image processing apparatus 120c respectively. The image processing apparatus 120b and image processing apparatus 120c may have the same function and operation as those of the image processing apparatus 120a except that they acquire captured moving image data from the image capturing apparatus 100b and the image capturing apparatus 100c respectively. Thus, their function and operation will not be explained. Note that in the following explanation, the image capturing sections 102a to 102c may sometimes be referred to collectively as image capturing sections 102, and that the captured moving image compressing sections 104a to 104c may sometimes be referred to collectively as captured moving image compressing sections 104.

The image processing apparatus 170 generates one moving image from a plurality of characteristic region moving image data and low-quality moving image data that are associated with each other and acquired from the image capturing apparatus 100b or the image capturing apparatus 100c, and supplies the generated moving image to the display apparatus 180b or the display apparatus 180c. The display apparatus 180b and the display apparatus 180c display the moving image supplied from the image processing apparatus 170.

By using the image processing system 10 according to the present embodiment, a surveillance system can be provided that acquires a high-quality image of any suitable surveillance target object that is outstanding, such as a person, a moving object, etc. In addition, the image processing system 10 can reduce the data amount of a moving image.

Figure 2:
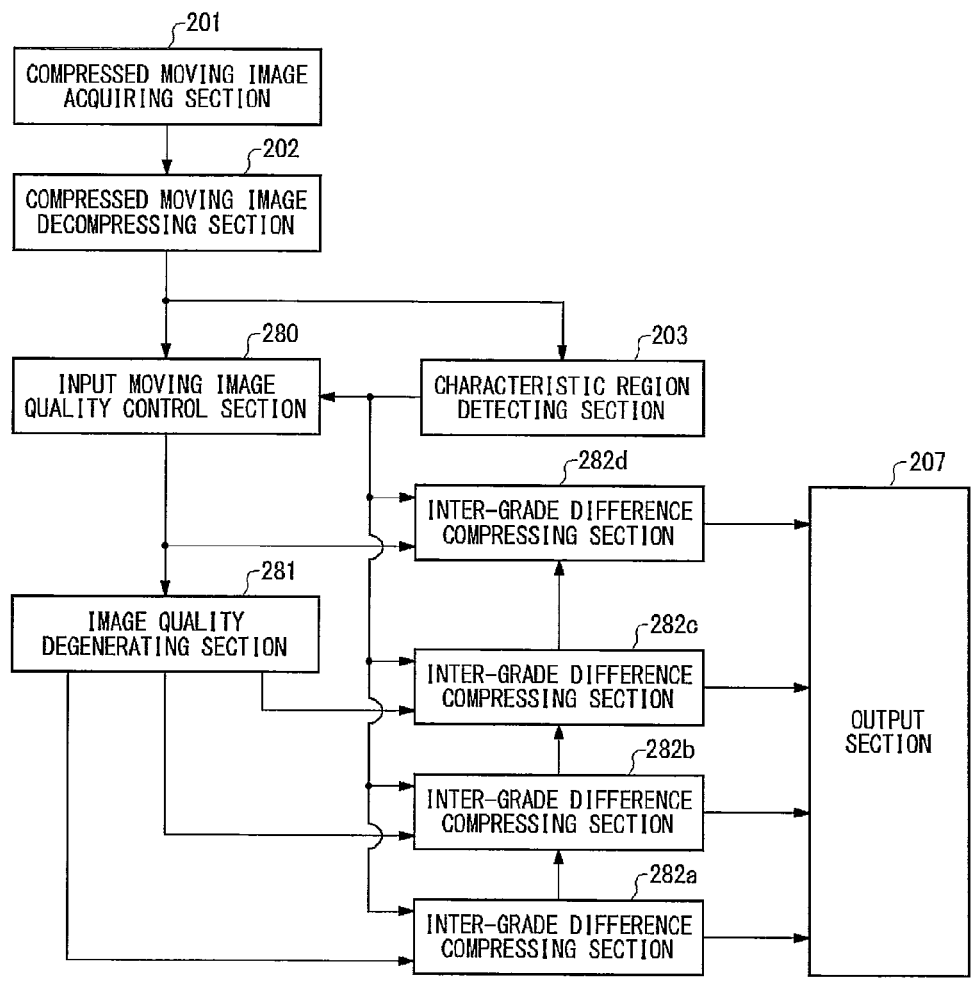
FIG. 2 shows one example block configuration of the image processing apparatus 120.

FIG. 2 shows one example block configuration of the image processing apparatus 120. The image processing apparatus 120 includes a compressed moving image acquiring section 201, a compressed moving image decompressing section 202, an input moving image quality control section 280, an image quality degenerating section 281, inter-grade difference compressing sections 282a to 282d which will be hereinafter collectively referred to as inter-grade difference compressing sections 282, and an output section 207.

The compressed moving image acquiring section 201 acquires a compressed moving image. Specifically, the compressed moving image acquiring section 201 acquires encoded captured moving image data generated by the image capturing apparatus 100. The compressed moving image decompressing section 202 restores the moving image from the data acquired by the compressed moving image acquiring section 201 to generate a plurality of moving image constituent images included in the moving image.

Specifically, the compressed moving image decompressing section 202 decodes the captured moving image data acquired by the compressed moving image acquiring section 201 to generate a plurality of moving image constituent images included in the moving image. The moving image constituent images include frame images and field images. The moving image constituent images constitute one example of the input image according to the present invention.

A characteristic region detecting section 203 detects characteristic regions from the plurality of moving image constituent images included in the moving image. The input moving image quality control section 280 controls the image quality of the characteristic regions and the image quality of the region other than the characteristic regions, according to the quantities of characteristics of the characteristic regions included in the plurality of moving image constituent images generated by the compressed moving image decompressing section 202. The function and operation of the input moving image quality control section 280 will be explained in detail with reference to FIG. 5.

The image quality degenerating section 281 generates a plurality of moving images having predetermined image qualities different from each other, by degenerating the image quality of a moving image. The image quality degenerating section 281 supplies the generated moving images with different image qualities to the inter-grade difference compressing sections 282. Specifically, the image quality degenerating section 281 generates moving images with different image qualities, by reducing the frame rate of a moving image, or by reducing the resolution or gradation of the moving image constituent images included in a moving image. The inter-grade difference compressing sections 282 acquire a moving image with a predetermined image quality from the image quality degenerating section 281, and compress the acquired moving image. The inter-grade difference compressing sections 282 each compress a different one of the moving images having different image qualities.

The moving image constituent images included in the moving image that is supplied by the image quality degenerating section 281 to the inter-grade difference compressing section 282a may be one example of the low-quality images in the present invention. The moving image constituent images included in the moving image that is supplied by the image quality degenerating section 281 or the input moving image quality control section 280 to the inter-grade difference compressing sections 282b to 282d may be one example of the characteristic region images in the present invention. In this case, the image quality degenerating section 281 and the input moving image quality control section 280 function as an image generating section in the present invention.

The inter-grade difference compressing section 282a acquires, from the image quality degenerating section 281, moving image constituent images having a resolution lower than that of the moving image constituent images to be received by any of the inter-grade difference compressing sections 282b to 282d, and compresses the acquired images. The inter-grade difference compressing section 282b, the inter-grade difference compressing section 282c, and the inter-grade difference compressing section 282d acquire moving image constituent images with resolutions ascending in this order, from the image quality degenerating section 281 or the input moving image quality control section 280 and compress the acquired images respectively.

The inter-grade difference compressing section 282b decompresses the moving image constituent images compressed by the inter-grade difference compressing section 282a, and enlarges the decompressed moving image constituent images to a resolution identical with the resolution of the moving image constituent images which it acquired from the image quality degenerating section 281. The inter-grade difference compressing section 282b compresses a differential image including any difference between the enlarged moving image constituent images and the moving image constituent images acquired from the image quality degenerating section 281. Note that the inter-grade difference compressing section 282b generates and compresses a differential image that has difference values in the characteristic regions but not in any other regions.

The inter-grade difference compressing section 282c decompresses the moving image constituent images compressed by the inter-grade difference compressing section 282b, and enlarges the decompressed moving image constituent images to a resolution identical with the resolution of the moving image constituent images which it acquired from the image quality degenerating section 281. The inter-grade difference compressing section 282c compresses a differential image including any difference between the enlarged moving image constituent images and the moving image constituent images acquired from the image quality degenerating section 281. Note that the inter-grade difference compressing section 282c generates and compresses a differential image that has a difference value in at least one of the plurality of characteristic regions according to the quantities of characteristics of the characteristic regions, but not in the other regions.

The inter-grade difference compressing section 282d decompresses the moving image constituent images compressed by the inter-grade difference compressing section 282c. The inter-grade difference compressing section 282d enlarges the decompressed moving image constituent images to the resolution identical with the resolution of the moving image constituent images which it acquired from the input moving image quality control section 280. The inter-grade difference compressing section 282d compresses a differential image including any difference between the enlarged moving image constituent images and the moving image constituent images acquired from the input moving image quality control section 280. Note that the inter-grade difference compressing section 282d generates and compresses a differential image that has a difference value in at least one of the plurality of characteristic regions according to the quantities of characteristics of the characteristic regions, but not in the other regions.

In this manner, the inter-grade difference compressing sections 282b to 282d compress a differential image obtained by deriving the difference between the moving image constituent images acquired from the input moving image quality control section 280 or the image quality degenerating section 281 and the enlarged versions of moving image constituent images with a lower resolution. The output section 207 multiplexes and outputs the moving images resulting from the compression by the respective inter-grade difference compressing sections 282. Specifically, the output section 207 sends the moving images resulting from the compression by the inter-grade difference compressing sections 282 to the image processing apparatus 170. In this way, the image processing apparatus 120 can provide moving images compressed and encoded scalably according to the quantities of characteristics of the characteristic regions.

Figure 3A:
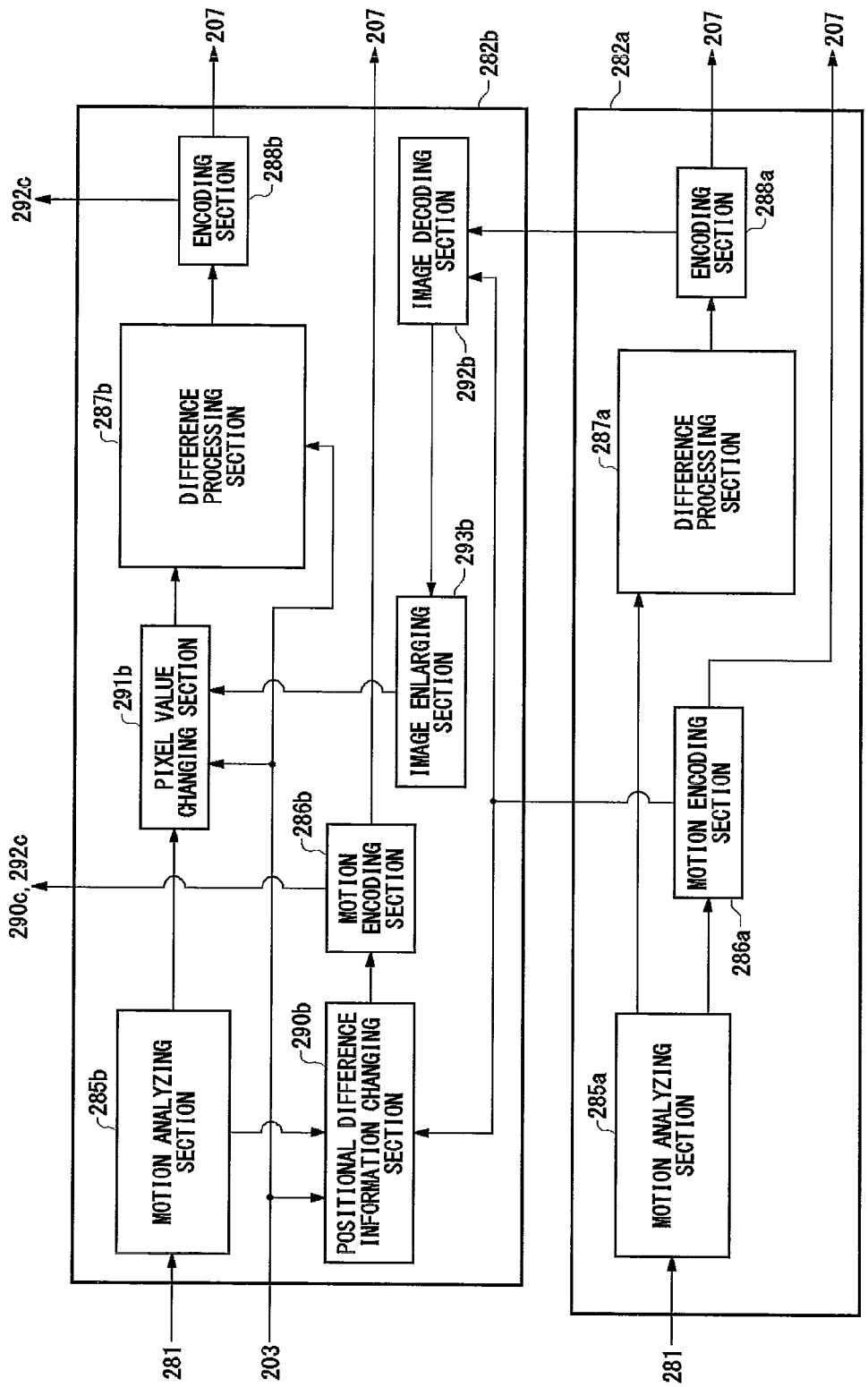
FIG. 3A shows one example block configuration of the inter-grade difference compressing sections 282a and 282b.
Figure 3B:
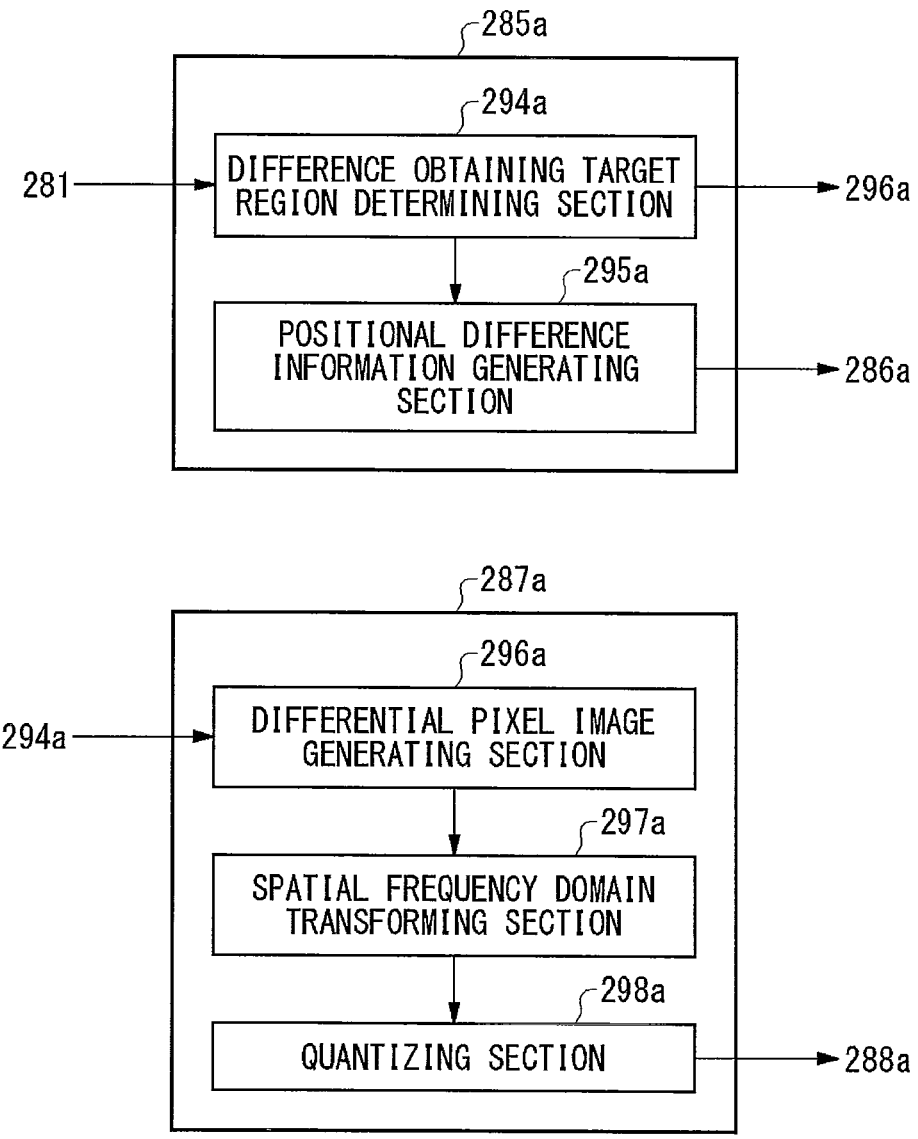
FIG. 3B shows one example block configuration of the inter-grade difference compressing sections 282a and 282b.
Figure 3C:
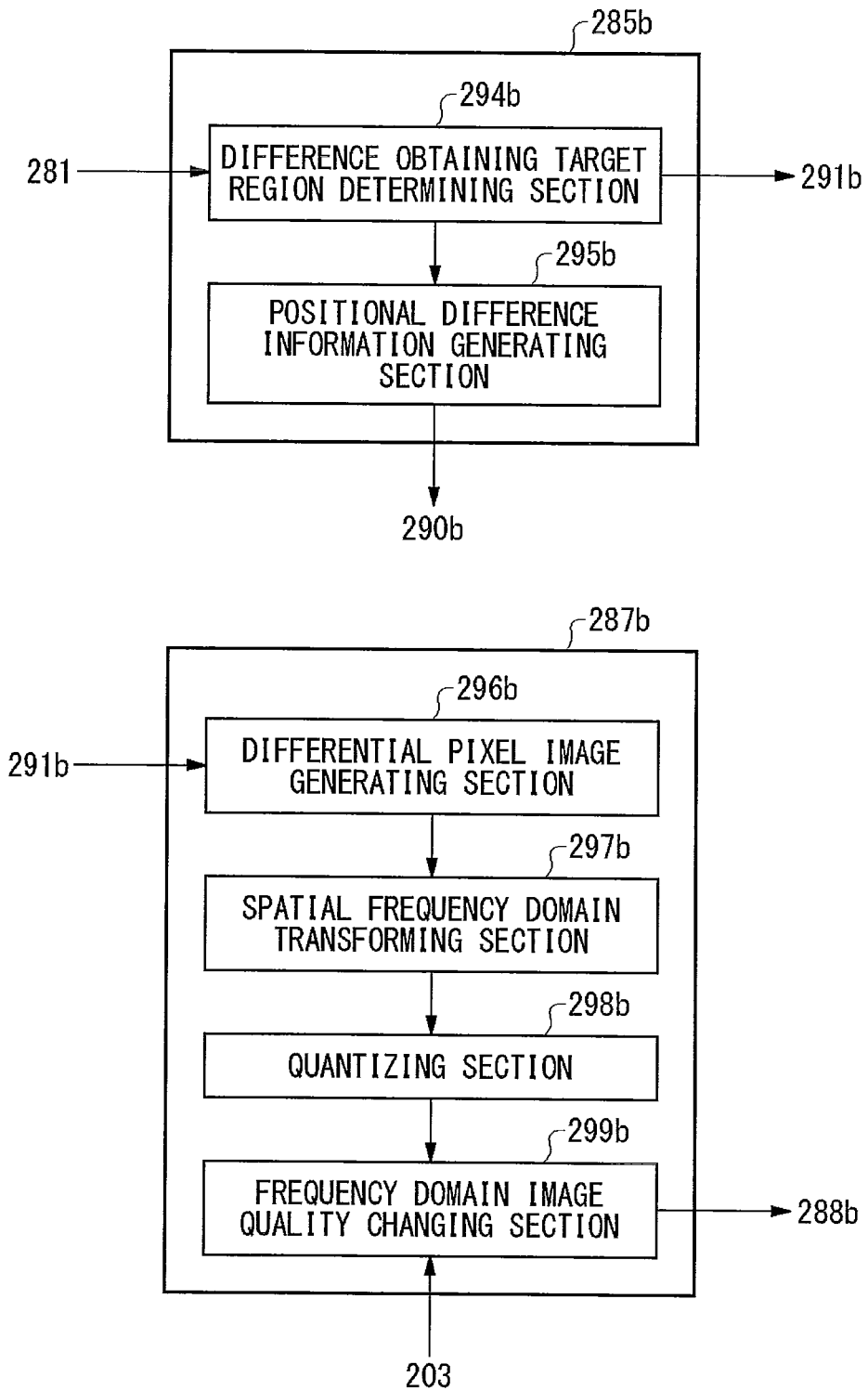
FIG. 3C shows one example block configuration of the inter-grade difference compressing sections 282a and 282b.

FIG. 3 shows one example block configuration of the inter-grade difference compressing sections 282a and 282b. The inter-grade difference compressing section 282a includes a motion analyzing section 285a, a motion encoding section 286; a difference processing section 287; and an encoding section 288a. The motion analyzing section 285a includes a difference obtaining target region determining section 294a and a positional difference information generating section 295a. The difference processing section 287a includes a differential pixel image generating section 296a, a spatial frequency domain transforming section 297a, and a quantizing section 298a.

The inter-grade difference compressing section 282b includes a motion analyzing section 285b, a motion encoding section 286b, a difference processing section 287b, an image enlarging section 293b, an image decoding section 292b, and an encoding section 288b. The motion analyzing section 285b includes a difference obtaining target region determining section 294b and a positional difference information generating section 295b. The difference processing section 287b includes a differential pixel image generating section 296b, a spatial frequency domain transforming section 297b, a quantizing section 298b, and a frequency domain image quality changing section 299b. The inter-grade difference compressing section 282c and the inter-grade difference compressing section 282d have substantially the same components as those of the inter-grade difference compressing section 282b, so will not be explained repetitively.

The function and operation of each component of the inter-grade difference compressing section 282a will now be explained below. The motion analyzing section 285a analyzes any motion that occurs throughout the plurality of moving image constituent images received from the image quality degenerating section 281 based on the image contents of the constituent images, and thereby determines partial regions based on which motion-based compression is performed on the moving image constituent images.

Specifically, the difference obtaining target region determining section 294a determines, based on pixel values taken by any partial region throughout the plurality of moving image constituent images, a partial region in a given moving image constituent image that is referred to as difference obtaining target when a moving image constituent image is to be encoded based on its difference from that reference moving image constituent image. The difference obtaining target region determining section 294a supplies the difference processing section 287a with pixel information of partial regions, which are the compressing target, and pixel information of such determined partial regions, which are the difference obtaining target.

The positional difference information generating section 295a generates positional difference information that indicates positional difference between the partial regions to be compressed differentially and the partial regions referred to as difference obtaining target. Specifically, the positional difference information generating section 295a generates motion vectors used for motion compensation. The positional difference information generating section 295a supplies the generated positional difference information to the motion encoding section 286a.

The motion encoding section 286a encodes the positional difference information supplied from the positional difference information generating section 295a, and supplies the encoded information to the output section 207. For example, the motion encoding section 286 encodes a difference between the positional difference information of one partial region and the positional difference information of an adjacent partial region, and supplies the encoded difference to the output section 207.

The difference processing section 287a compresses the images of the compressing target partial regions based on a difference between the pixel information of the compressing target partial regions and the pixel information of the difference obtaining target partial regions, both of which information are acquired from the motion analyzing section 285a. Specifically, the differential pixel image generating section 296a generates a differential pixel image based on the difference between the pixel information of the compressing target partial regions and the pixel information of the difference obtaining target partial regions.

The spatial frequency domain transforming section 297a transforms the differential pixel image, on the basis of partial region by partial region, into spatial frequency domain. Specifically, the spatial frequency domain transforming section 297a transforms each partial region in the differential pixel image into spatial frequency domain by discrete cosine transform (DCT). The spatial frequency domain transforming section 297a may transform each partial region in the differential pixel image into spatial frequency domain by various manners of frequency transform such as Hadamard transform, wavelet transform, etc.

When the motion analyzing section 285a determines that the compression will not be based on difference calculated from partial regions of another moving image constituent image, the difference processing section 287a supplies the pixel information of the compressing target partial regions to the spatial frequency domain transforming section 297a. The spatial frequency domain transforming section 297a transforms the pixel information on the basis of partial region by partial region into spatial frequency domain, in the way described above.

The quantizing section 298a quantizes transform coefficients obtained from the transform into the spatial frequency domain by the spatial frequency domain transforming section 297a. The encoding section 288a performs compression by encoding the transform coefficients quantized by the quantizing section 298a. For example, the encoding section 288 encodes the transform coefficients quantized by the quantizing section 298a by entropy encoding such as Huffman coding, arithmetic coding, etc. The encoding section 288a supplies the output section 207 with a moving image resulting from the encoding.

The function and operation of each component included in the inter-grade difference compressing section 282b will now be explained below. Among the components included in the inter-grade difference compressing section 282b, those components that are labeled with the same reference numeral with that of the components included in the inter-grade difference compressing section 282a have the same function and operation as those of the components included in the inter-grade difference compressing section 282a, so only any difference between them will be explained.

Likewise the difference obtaining target region determining section 294a, the difference obtaining target region determining section 294b specifies, for each of the plurality of moving image constituent images acquired from the image quality degenerating section 281, partial regions in another moving image constituent image, the difference between which and compressing target partial regions included in the moving image constituent image concerned should be obtained. In this manner, the difference obtaining target region determining section 294b determines difference obtaining target partial regions, which are partial regions in a characteristic region image generated from a moving image constituent image, the difference between which and another characteristic region image should be obtained. The difference obtaining target region determining section 294b supplies a pixel value changing section 291b with the pixel information of the compressing target partial regions and the pixel information of the difference obtaining target partial regions.

The image decoding section 292b acquires the moving image constituent images from the encoding section 288a and the positional difference information from the motion encoding section 286a. The image decoding section 292b decodes the moving image constituent images acquired from the encoding section 288a based on the positional difference information acquired from the motion encoding section 286a. The image decoding section 292b may acquire and decode the moving image constituent images quantized by the quantizing section 298a, or may acquire and decode the moving image constituent images encoded by the encoding section 288a. The moving image constituent images resulting from the decoding by the image decoding section 292b may be one example of low-quality images according to the present invention. In this case, the inter-grade difference compressing section 282a functions as an image generating section that generates the low-quality images according to the present invention.

The image enlarging section 293b generates enlarged images by enlarging the moving image constituent images decoded by the image decoding section 292b. Of the partial regions determined by the difference obtaining target region determining section 294b, the pixel value changing section 291b keeps a partial region that is included in a characteristic region with an unchanged pixel value, while changing a partial region that is not included in a characteristic region to have its pixel value replaced with that of the partial region included in the enlarged image.

In this manner, the pixel value changing section 291b generates, from the input moving image constituent images, characteristic region images, in which the pixel values of the regions other than the characteristic regions have been replaced with the pixel values in the enlarged images. Note that the pixel value changing section 291b can function as an image generating section that generates characteristic region images, in which the pixel values of the regions other than the characteristic regions have been replaced with the pixel values in the enlarged images.

The difference processing section 287b receives, from the pixel value changing section 291b, a characteristic region image, which is the compressing target, image information of the partial regions, difference between which and the partial regions included in the compressing target characteristic region image should be obtained, and the enlarged image. The difference processing section 287b determines which of intra-encoding, inter-encoding, and inter-grade encoding should be adopted for each of the plurality of partial regions included in the compressing target characteristic region image. Here, intra-encoding is to encode the image by using pixel information within the same characteristic region image. Inter-encoding is to encode the image based on the difference from the difference obtaining target partial regions included in another moving image constituent image. Inter-grade encoding is to encode the image based on difference from the enlarged image. At this time, the difference processing section 287b preferentially selects an encoding manner that will result in a smaller amount of codes in the encoded image. The following description will first explain a case where inter-grade encoding is selected because inter-grade encoding should be selected as the pixel values have been replaced so that the regions other than the characteristic regions will have no difference. After this, cases where inter-encoding and the intra-encoding are selected respectively will be explained.

When inter-grade encoding is selected, the differential pixel image generating section 296b generates a differential pixel image that indicates the difference in pixel value between the characteristic region image and the enlarged image. Specifically, the differential pixel image generating section 296b generates a differential pixel image based on the difference between the characteristic region image, in which the pixel values of the regions other than the characteristic regions have been replaced, and the enlarged image. Since the pixel values of the regions other than the characteristic regions in the characteristic region image have been replaced with the pixel values in the enlarged image, the differential pixel image generating section 296b can generate a differential pixel image, in which each characteristic region has a difference between the pixel value of the characteristic region image and the pixel value of the enlarged image and the regions other than the characteristic regions have no pixel value difference.

When inter-encoding is selected, the differential pixel image generating section 296b obtains a difference between the characteristic region image generated by the pixel value changing section 291b and a characteristic region image generated by the pixel value changing section 291b from another moving image constituent image. Specifically, the differential pixel image generating section 296b obtains a difference between the image of any partial region that is included in the characteristic region and the image of the difference obtaining target partial region that is determined for that partial region by the difference obtaining target region determining section 294b. Since the pixel values of the regions other than the characteristic regions of the characteristic region image have been replaced with the pixel values in the enlarged image, the differential pixel image generating section 296b generates a differential pixel image, in which a partial region that is included in a characteristic region has a difference in pixel value from the partial region determined by the difference obtaining target region determining section 294b, and the regions other than the characteristic regions have a difference in pixel value from the partial regions determined by the difference obtaining target region determining section 294b.

When intra-encoding is selected, the differential pixel image generating section 296b generates a differential pixel image by obtaining a difference in pixel value between each partial region included in each characteristic region image and another region in the same characteristic region image, or by obtaining a difference between a pixel value in a given partial region and a pixel value in the same partial region.

The spatial frequency domain transforming section 297b transforms the differential pixel image on the basis of partial region by partial region into spatial frequency domain. Specifically, likewise the spatial frequency domain transforming section 297a, the spatial frequency domain transforming section 297b transforms each partial region into spatial frequency domain by discrete cosine transform (DCT), Hadamard transform, wavelet transform, or the like. The quantizing section 298b, likewise the quantizing section 298a, quantizes transform coefficients obtained from the transform into spatial frequency domain by the spatial frequency domain transforming section 297b.

The frequency domain image quality changing section 299b generates a characteristic region difference image or an inter-characteristic region difference image by reducing the data amount of the spatial frequency component of at least one of the partial regions including the regions other than the characteristic regions, among the spatial frequency components of the respective partial regions obtained by the transform into spatial frequency domain by the spatial frequency domain transforming section 297b. Specifically, the frequency domain image quality changing section 299b reduces the magnitude of any transform coefficient that indicates a frequency component higher than a predetermined frequency. The frequency domain image quality changing section 299b may change the transform coefficient that indicates a frequency component higher than the predetermined frequency to 0.

In this manner, the difference processing section 287b generates a characteristic region difference image, in which each characteristic region has a spatial frequency component, which is the difference, transformed into spatial frequency domain, between the characteristic region image and the enlarged image, and the regions other than the characteristic regions have had their spatial frequency component reduced in data amount. The encoding section 288*b* encodes the characteristic region difference image generated by the difference processing section 287*b*.

As described above, the characteristic region difference image generated by the difference processing section 287*b* represents a differential image between the image of each characteristic region in the characteristic region image and the image of each characteristic region in the low-quality image. Specifically, the characteristic region difference image generated by the difference processing section 287 indicates the difference between the image of each characteristic region in the characteristic region image and the enlarged image of each characteristic region in the low-quality image.

The positional difference information generating section 295*b* generates positional difference information that indicates positional difference between partial regions included in regions other than the characteristic regions and partial regions, the difference from which should be obtained. Specifically, likewise the positional difference information generating section 295*a*, the positional difference information generating section 295*b* generates positional difference information that indicates positional difference between partial regions, which are to be differentially compressed, and difference obtaining target partial regions, the difference from which should be obtained. Note that the positional difference information includes motion vectors used for motion compensation.

A positional difference information changing section 290*b* changes the positional difference information so that the positional difference information will indicate that the difference of partial regions included in regions other than the characteristic regions should be obtained from the partial regions at the very identical position. Specifically, the positional difference information changing section 290*b* changes the positional difference information of the partial regions included in the regions other than the characteristic regions to information indicating that there is no positional difference. Further, the positional difference information changing section 290*b* acquires the positional difference information from the motion encoding section 286*a*, and changes the positional difference information of partial regions included in regions other than the characteristic regions to information indicating that there is no positional difference. Specifically, the positional difference information changing section 290*b* changes the length of the motion vectors of the regions other than the characteristic regions to 0. Specifically, the positional difference information changing section 290*b* changes the length of the motion vectors acquired from the positional difference information generating section 295*b* to 0, and also changes the length of the motion vectors acquired from the motion encoding section 286*a* to 0.

Then, the motion encoding section 286*b* encodes the positional difference information. Specifically, the motion encoding section 286*b*, likewise the motion encoding section 286*a*, encodes a difference between the positional difference information of one partial region and the positional difference information of an adjacent partial region. The positional difference information encoded by the motion encoding section 286*b* is supplied to the output section 207.

In the present embodiment, the positional difference information changing section 290*b* changes the positional difference information of the regions other than the characteristic regions, but the positional difference information changing section 290*b* may change the positional difference information of the regions other than the characteristic regions in the encoded images resulting from the encoding by the motion encoding section 286*b*. That is, the positional difference information changing section 290*b* may change the positional difference information encoded by the motion encoding section 286*b*, so that the information will indicate that the difference of the partial regions other than the characteristic regions should be obtained from the partial regions at the very identical position.

The encoding section 288*b* may generate encoded data that includes no difference information in the regions other than the characteristic regions. Specifically, the encoding section 288*b* may generate encoded data that has no difference information in the partial regions included in the regions other than the characteristic regions. The motion encoding section 286*b* may generate encoded data that has no positional difference information in the partial regions included in the regions other than the characteristic regions. In this way, the encoding section 288*b* and the motion encoding section 286*b* generate encoded data that indicates, by including neither difference information nor positional difference information, that the image content in the regions other than the characteristic regions is identical with the image content in the counterpart regions in another moving image constituent image. For example, the encoding section 288*b* and the motion encoding section 286*b* may generate encoded data that includes partial regions of a category indicating that the image content of the partial regions concerned included in the regions other than the characteristic regions is identical with the image content of the counterpart regions in another moving image constituent image.

For example, the encoding section 288*b* and the motion encoding section 286*b* may generate encoded data that includes partial regions of a category indicating that the partial regions concerned included in the regions other than the characteristic regions are encoded by a simple inter-frame prediction encoding mode so has no transform coefficients. For example, the category of these partial regions may be the equivalent of NonMC NotCoded in MPEG encoding. By generating encoded data that includes information indicating that the length of motion vectors and the difference information are both zero, the encoding section 288*b* and the motion encoding section 286*b* can further reduce the amount of codes in the moving image constituent images after encoded. When determining prediction modes including the above-described encoding modes, the inter-grade difference compressing section 282*b* may select, based on Lagrange's method of undetermined multipliers, a prediction mode that can minimize rate-distortion cost.

The inter-grade difference compressing section 282*c* and the inter-grade difference compressing section 282*d* include components that have the same functions as those of the inter-grade difference compressing section 282*b*. In the following explanation, the components of the inter-grade difference compressing section 282*c* and inter-grade difference compressing section 282*d* that have the same name as that of the components of the inter-grade difference compressing section 282 will be denoted by the same reference numerals. To which of the inter-grade difference compressing sections 282*b* to 282*d* these components are included will be indicated by the last letter (b, c, d) of their reference numerals.

For example, a motion analyzing section 285*c* is a component of the inter-grade difference compressing section 282*c*, and a motion analyzing section 285*d* is a component of the inter-grade difference compressing section 282*d*. In the following explanation, any reference numeral that has no alphabetical letter at the tail can indicate all components labeled with this reference numeral included in the inter-grade difference compressing sections 282*b* to 282*d*. For example, "pixel value changing section 291" can indicate each of the pixel value changing sections 291b to 291d.

The function and operation of the inter-grade difference compressing section 282c and inter-grade difference compressing section 282d are different from those of the inter-grade difference compressing section 282b in that the inter-grade difference compressing sections 282c and 282d process moving images of different image qualities acquired from the image quality degenerating section 281 and the input moving image quality control section 280 respectively, and in that the positional difference information changing sections 290c and 290d and the image decoding section 292c and 292d acquire positional difference information for difference obtaining purpose and moving image constituent images for difference obtaining purpose, from another inter-grade difference compressing section 282 that processes a moving image of a lower image quality.

Specifically, the positional difference information changing section 290c acquires the positional difference information from the motion encoding section 286b, and changes the acquired positional difference information. The image decoding section 292c acquires the positional difference information from the motion encoding section 286b and the moving image constituent images from the encoding section 288b, and decodes the acquired moving image constituent images based on the acquired positional difference information. The positional difference information changing section 290d acquires the positional difference information from the motion encoding section 286c and changes the acquired positional difference information. The image decoding section 292d acquires the positional difference information from the motion encoding section 286c and the moving image constituent images from the encoding section 288c, and decodes the acquired moving image constituent images based on the acquired positional difference information.

The characteristic region detecting section 203 detects a plurality of characteristic regions of different categories from each other, from the input moving image constituent images. In this case, the image quality degenerating section 281 generates one characteristic region image from the input images by reducing the resolution of a characteristic region of one category, and generates another characteristic region image, in which a characteristic region of another category has a higher resolution than that in the former characteristic region image. The inter-grade difference compressing section 282b and 282c process characteristic region images which correspond to characteristic regions of certain categories respectively, and in which a characteristic region of at least a predetermined category has a resolution different from that of the rest of the region in the image.

Specifically, the inter-grade difference compressing section 282b processes a low-resolution characteristic region image that has the lowest resolution in the region, in which all the characteristic regions are included. The inter-grade difference compressing section 282c processes a middle-resolution characteristic region image, in which a characteristic region of a predetermined category has a resolution higher than that in the low-resolution characteristic region image. The inter-grade difference compressing section 282d processes a high-resolution characteristic region image, in which a characteristic region of another predetermined category has a high resolution.

The difference processing section 287 generates a characteristic region difference image, in which (1) a characteristic region of one category and a characteristic region of another category both have a spatial frequency component, which is a difference, transformed into spatial frequency domain, between one characteristic region image and its corresponding enlarged image, and (2) the regions other than the characteristic region of the one category and characteristic region of the another category have their spatial frequency component reduced in data amount.

The difference processing sections 287 generate a characteristic region difference image, in which (a) a characteristic region of one category has a spatial frequency component, which is a difference, transformed into spatial frequency domain, between one characteristic region image and its corresponding enlarged image, and (b) the regions other than the characteristic region of the one category have their spatial frequency component reduced in data amount, or generate an inter-characteristic region difference image, in which (i) a characteristic region of another category has a spatial frequency component, which is a difference, transformed into spatial frequency domain, between another characteristic region image and the enlarged image in which the characteristic region in the another characteristic region image is enlarged, and (ii) the regions other than the characteristic region of the another category have their spatial frequency component reduced in data amount.

The encoding sections 288 encode the characteristic region difference images, the inter-characteristic region difference image, and the low-quality image, respectively. The output sections 207 multiplex the positional difference information encoded by the motion encoding sections 286a to 286d and the moving image constituent images, e.g., the low-quality image, the characteristic region difference images, and the inter-characteristic region difference image, which are encoded by the encoding sections 288a to 288d, and output the multiplexed data.

As obvious from the above-explanation, the inter-grade difference compressing section 282a generates moving image constituent images, of which the whole image region including the characteristic regions has low image quality, i.e., moving image constituent images that have the low spatial frequency components of the input moving image constituent images. The inter-grade difference compressing section 282b generates moving image constituent images that have frequency components higher than those of the images generated by the inter-grade difference compressing section 282a and lower than those of the images generated by the inter-grade difference compressing section 282c. In the moving image compressing images generated by the inter-grade difference compressing section 282b, the difference, of the regions other than the characteristic regions, from the moving image constituent images generated by the inter-grade difference compressing section 282a, is reduced.

Likewise, the inter-grade difference compressing section 282c generates moving image constituent images that have frequency components higher than those of the images generated by the inter-grade difference compressing section 282b and lower than those of the images generated by the inter-grade difference compressing section 282d. The inter-grade difference compressing section 282d generates moving image constituent images that have frequency components higher than those of the images generated by the inter-grade difference compressing section 282c. In the moving image compressing images generated by the inter-grade difference compressing section 282c and inter-grade difference compressing section 282d, the difference, of the regions other than the characteristic regions, from the moving image constituent images generated by the inter-grade difference compressing section 282b and inter-grade difference compressing section 282c, is reduced.

Each of the inter-grade difference compressing sections 282b to 282d can provide to the outside, a moving image, the image quality of which varies according to the categories of the characteristic regions, by processing a moving image, in which characteristic regions of predetermined categories have an image quality higher than that of the other regions. At this time, the inter-grade difference compressing sections 282b to 282d perform compression based on the difference from the lower-quality moving image constituent images processed by another inter-grade difference compressing section 282, so the compression becomes efficient.

When the characteristic region detecting section 203 detects the quantity of a characteristic of each of a plurality of characteristic regions, it may calculate a reliability degree indicating the degree of how sure the detected characteristic is of a characteristic region, for each of the plurality of characteristic regions. The inter-grade difference compressing sections 282b to 282d compress the images of the characteristic regions, the resolution of which has been adjusted according to the quantity of characteristic and its reliability degree, both obtained for each of the plurality of characteristic regions. For example, the image quality degenerating section 281 may adjust the resolution of the images of the plurality of characteristic regions according to the quantity of characteristic and reliability degree obtained for each characteristic region, and may supply the adjusted images to the inter-grade difference compressing sections 282. For example, the image quality degenerating section 281 may change the images of the plurality of characteristic regions to a resolution higher, by a larger amount when the reliability degree is lower, than a resolution predetermined according to the quantity of characteristic.

The image processing apparatus 120 performs hierarchical encoding by encoding a difference between a plurality of images of different grades having different resolutions. As obvious from this, the compression methods adopted by the image processing apparatus 120 includes a method according to H.264/SVC.

The image processing apparatus 170 acquires plural sets of moving image constituent images compressed by the inter-grade difference compressing sections 282a to 282d respectively. The image processing apparatus 170 decodes each of the acquired plural sets of moving image constituent images. The image processing apparatus 170 overlays together corresponding images from the plural sets of moving image constituent images obtained by the decoding to generate combined images. The image processing apparatus 170 supplies the display apparatus 180 with a moving image that includes, as its constituent images, the generated combined images.

The characteristic region detecting section 203 can detect an ROI to be a region containing a person's face, a person's body, a part of a person's body such as a hand or head, or at least a portion of a living creature other than a person. Such a living creature may include any organism that has a specific internal composition, such as a circulatory system or organs. In addition to living creatures, the characteristic region detecting section 203 may also detect the ROI to be a region including currency, a card such as an ATM card, an automobile, or an automobile's license plate.

In addition to pattern matching methods such as template matching, the characteristic region detecting section 203 can detect the ROI based on a result obtained through machine learning as described in Japanese Patent Application Publication No. 2007-188419, such as adaboost. For example, the characteristic region detecting section 203 can learn the characteristics of an amount of image characteristics extracted from the image of a predetermined subject, by using the amount of image characteristics extracted from the image of the predetermined subject and the amount of image characteristics extracted from the image of subjects other than the predetermined subject. The characteristic region detecting section 203 may detect the ROI to be a region from which is extracted the amount of image characteristics including the characteristics corresponding to the learned characteristics. In this way, the characteristic region detecting section 203 can detect the ROI to be a region in which the image of a predetermined subject is captured. The characteristic region detecting section 203 may detect the ROI in any shape, including a rectangle.

The characteristic region detecting section 203 may detect ROTS by a method described in Japanese Patent Application Publication No. 2008-078641. For example, the characteristic region detecting section 203 thins a captured image from which to detect an object, with a predetermined thinning ratio, or further thins the thusly thinned image stepwise with this thinning ratio, thereby generating an image set that includes the captured image and one or more thinned image(s). Then, the characteristic region detecting section 203 applies a first filter to a first image that is relatively small in the generated image set, thereby calculating an evaluation value. Here, the first filter acts on a two-dimensional region in an image, and generates an evaluation value that represents the percentage of a probability that an object of a specific category may exist in that region. Among at least two filters that respectively act on regions of different sizes, among which regions the number of pixels included, which corresponds to the size of each region, is different at a predetermined ratio or different stepwise at the predetermined ratio, the first filter may be one that acts on a relatively narrow region. The characteristic region detecting section 203 extracts, from the first image, a region, from which an evaluation value larger than a predetermined first threshold is obtained, as a primary candidate region.

Then, the characteristic region detecting section 203 applies a second filter among the filters to a region in a second image that corresponds to the primary candidate region and calculates an evaluation value. The second image includes a number of pixels that is larger by one step than the number of pixels in the first image. The second filter acts on a region that is wider by one step than the region to which the first filter should be applied. The characteristic region detecting section 203 extracts a region, from which an evaluation value larger than a predetermined second threshold is obtained, as a secondary candidate region.

The characteristic region detecting section 203 repeats the extraction process of applying any of the plurality of filters, prepared for regions of different sizes respectively, to a region having a corresponding size in the image set to extract a candidate region. At this time, the characteristic region detecting section 203 performs the extraction process of applying a filter for a narrower region and the extraction process of applying a filter for a wider region in this order. Specifically, the characteristic region detecting section 203 performs the extraction process of applying a filter prepared for a narrower region to a smaller image and the extraction process of applying a filter prepared for a wider region to a larger image in this order. The characteristic region detecting section 203 repeats the extraction process twice or more and extracts a final candidate region, thereby detecting an object of a predetermined category. The characteristic region detecting section 203 detects the region in which the object of the predetermined category exists, as an ROI. Here, in a given extraction process, the characteristic region detecting section 203 applies a filter to only the region that has been extracted in the extraction process immediately prior. Accordingly, through the repetitive extraction processes, whether an object present in a former image is present or absent in a succeeding image is discriminated repetitively, enabling a more accurate detection of an ROI. Further, since rough filtering for an ROI is firstly done with a smaller image, an ROI can be detected more quickly.

The characteristic region detecting section 203 may detect ROIs by a method described in Japanese Patent Application Publication No. 2008-078636. For example, the characteristic region detecting section 203 detects an ROI by using a plurality of filters that act on the same two-dimensional region of a predetermined size in a captured image to calculate a quantity of an arbitrary characteristic of the contour and the inner region of an object of a predetermined category, which characteristic is different from that calculated by any other of the plurality of filters. Specifically, the characteristic region detecting section 203 calculates quantities of a plurality of characteristics, by applying the plurality of filters to a region of a predetermined size in a captured image from which to detect an object. The plurality of filters are each associated with primary evaluation values with which the quantity of characteristic calculated by the filter is compared in order to obtain the percentage of a probability that the characteristic concerned may be of an object of a predetermined category. Based on this association, the characteristic region detecting section 203 discriminates a primary evaluation value that corresponds to the quantity of each calculated characteristic. The characteristic region detecting section 203 sums up the plurality of primary evaluation values discriminated for the plurality of filters respectively, thereby obtaining a secondary evaluation value that represents the percentage of probability that the object of the predetermined category may exist in the filtered region. The characteristic region detecting section 203 compares the secondary evaluation value with a threshold, and extracts the region as an ROI in which the object of the predetermined category exists, if the percentage of probability that the object of the predetermined category may exist in this region is higher than the threshold. By combining a plurality of filters that extract quantities of various characteristics of the contour and inner region of an object, the characteristic region detecting section 203 can extract an ROI more accurately than when extracting an ROI based only on, for example, the shape of the contour.

The characteristic region detecting section 203 may detect ROIs by combining the method described in Japanese Patent Application Publication No. 2008-078636 and the method described in Japanese Patent Application Publication No. 2008-078641. Specifically, the plurality of filters explained in connection with the method described in Japanese Patent Application Publication No. 2008-078636 may include plural groups of filters, each group of filters prepared for a region of a specific size, i.e., plural groups of filters that act on regions of different sizes respectively, among which regions the number of pixels included in each region is different from that in the other regions at a predetermined ratio or different stepwise at the predetermined ratio. As above, each filter may be associated with suitable evaluation values. By thinning a captured image from which to detect an object with a predetermined thinning ratio, or further thinning the thusly thinned image stepwise with this thinning ratio, the characteristic region detecting section 203 generates an image set that includes the captured image and one or more thinned image(s). The characteristic region detecting section 203 calculates quantities of a plurality of characteristics by applying a plurality of first filters for a narrower region to a first image that is relatively small in the generated image set. The characteristic region detecting section 203 discriminates a primary evaluation value for the quantity of each of the plurality of characteristics calculated, based on the association given for each of the plurality of first filters. The characteristic region detecting section 203 sums up the plurality of primary evaluation values, thereby obtaining a secondary evaluation value representing the percentage of probability that the object of the predetermined category may exist in the filtered region. The characteristic region detecting section 203 compares the obtained secondary evaluation value with a first threshold, and extracts the region as a primary candidate region, if the percentage of probability that the object of the predetermined category may exist in this region is higher than the first threshold.

The characteristic region detecting section 203 calculates quantities of a plurality of characteristics, by applying a plurality of second filters for a region wider by one step than the region acted on by the plurality of first filters, to a region corresponding to the primary candidate region in a second image in the image set that includes a number of pixels larger by one step than that in the first image. The characteristic region detecting section 203 discriminates a primary evaluation value for the quantity of each of the plurality of characteristics calculated, based on the association given for each of the plurality of second filters. The characteristic region detecting section 203 sums up the plurality of primary evaluation values corresponding to the plurality of second filters respectively, thereby obtaining a secondary evaluation value that represents the percentage of probability that the object of the predetermined category may exist in the region corresponding to the primary candidate region. The characteristic region detecting section 203 compares the obtained secondary evaluation value with a second threshold, and extracts the region as a secondary candidate region, if the percentage of probability that the object of the predetermined category may exist in this region is higher than the second threshold.

The characteristic region detecting section 203 repeats the extraction process of applying each of the plural groups of filters, prepared for regions of different sizes respectively, to a region having a corresponding size in the image set to extract a candidate region. At this time, the characteristic region detecting section 203 performs the extraction process of applying a group of filters for a narrower region and the extraction process of applying another group of filters for a wider region in this order. Specifically, the characteristic region detecting section 203 performs the extraction process of applying a group of filters prepared for a narrower region to a smaller image and the extraction process of applying another group of filters prepared for a wider region to a larger image in this order. The characteristic region detecting section 203 repeats the extraction process twice or more and extracts a final candidate region, thereby detecting an object of a predetermined category. The characteristic region detecting section 203 detects the region in which the object of the predetermined category exists, as an ROI.

The characteristic region detecting section 203 may detect ROIs by a method described in Japanese Patent Application Publication No. 2008-098600. For example, the characteristic region detecting section 203 detects an ROI from a plurality of captured images included in moving images captured by a plurality of image capturing apparatuses 100. For example, assume that the image capturing apparatus 100a and the image capturing apparatus 100b are capturing the same scene as that captured by the other. The image capturing apparatus 100a and the image capturing apparatus 100b can function as, for example, stereo cameras. In the following explanation, a first captured image obtained by the image capturing apparatus 100a and a second captured image obtained by the image capturing apparatus 100b may be called paired images. The characteristic region detecting section 203 detects, from the paired images, an object of a predetermined category captured in the paired images, and detects the region in which the detected object of the predetermined category exists, as an ROI.

The characteristic region detecting section 203 extracts, from each of the first and second captured images paired, a region in which the object of the predetermined category is captured. The characteristic region detecting section 203 may detect the region in which the object of the predetermined category is captured, with a rough detection accuracy. The characteristic region detecting section 203 detects the object of the predetermined category, by detecting, from the extracted region in the first captured image and from the extracted region in the second captured image, a pair of counterpart regions. For example, the characteristic region detecting section 203 calculates a distance from each of the paired counterpart regions to the object captured in the extracted region. The characteristic region detecting section 203 can detect the object of the predetermined category, based on the three-dimensional shape of the object obtained from the calculated distances to the object.

When detecting a pair of counterpart regions, the characteristic region detecting section 203 divides the region extracted from each of the paired first and second captured images, in which region the object of the predetermined category is captured, into a plurality of sub-regions. The characteristic region detecting section 203 calculates a vector, across some sub-regions, of a characteristic quantity that characterizes a partial image in each sub-region. The characteristic quantity may be, for example, a pixel value. The vector across some sub-regions may be, for example, a gradient vector, e.g., a pixel value gradient vector. The characteristic region detecting section 203 calculates a logical distance between the calculated vector in the first image and the calculated vector in the second image. The characteristic region detecting section 203 detects, as a pair of counterpart regions, a region in the first image made up of the sub-regions across which the vector runs and a region in the second image made up of the sub-regions across which the vector runs, if the logical distance between the vectors is smaller than a predetermined value. The logical distance may be, for example, the square root of the square sum of the differences between the respective components of one vector and the counterpart components of the other vector. The characteristic region detecting section 203 can extract a pair of counterpart regions from the paired images with high accuracy, and thus can calculate the distances to the object with high accuracy. Hence, the characteristic region detecting section 203 can identify the three-dimensional shape of the object with high accuracy, and as a result can detect the object of the predetermined category with high accuracy.

The characteristic region detecting section 203 may detect ROIs by the method described in Japanese Patent Application Publication No. 2008-091562. For example, the characteristic region detecting section 203 extracts, from a plurality of captured images included in a moving image, putative object shapes that are similar to an object of a predetermined category, together with the dimension of the putative object shapes and positional information indicating the position of the putative object shapes in terms of the field angle of the image capturing apparatus 100. The positional information in terms of the field angle may be, for example, a position in an image region in each captured image. The characteristic region detecting section 203 determines whether or not an article represented by the extracted putative object shapes is an object of a predetermine category, thereby extracting the object of the predetermined category. For example, the characteristic region detecting section 203 may count the number of times an article represented by putative object shapes that have the same dimension is searched out from a predetermined search region surrounding the article represented by putative object shapes, and may extract the article represented by the putative object shapes as the object of the predetermined category if the counted number is equal to or larger than a threshold. The characteristic region detecting section 203 may detect the region, in which the object of the predetermined category is included, as an ROI. Hence, the characteristic region detecting section 203 can detect, as the object of the predetermined category, an article represented by putative object shapes that exist in an image region, from which an article having a dimension close to a predetermined dimension is searched out intensively. The characteristic region detecting section 203 needs not to detect an article having a putative object shape that exists in anywhere other than the image region concerned, as the object of the predetermined category. Hence, the characteristic region detecting section 203 can reduce the possibility of mistakenly detecting an article having a putative object shape that exists in anywhere other than the image region concerned, as the object of the predetermined category.

If the image capturing apparatus 100 can capture images with variable field angles, the aforementioned positional information in terms of field angle may be, for example, the direction in which the image capturing apparatus 100 captures images, and a position in a captured image. If it is possible, by using a plurality of image capturing apparatuses 100, to capture fields of a continuous depth that is larger than the depth of a field captured by one image capturing apparatus 100, the positional information in terms of field angle may be, for example, the direction in which each image capturing apparatus 100 captures images, and a position in a captured image captured by each image capturing apparatus 100.

Figure 4:
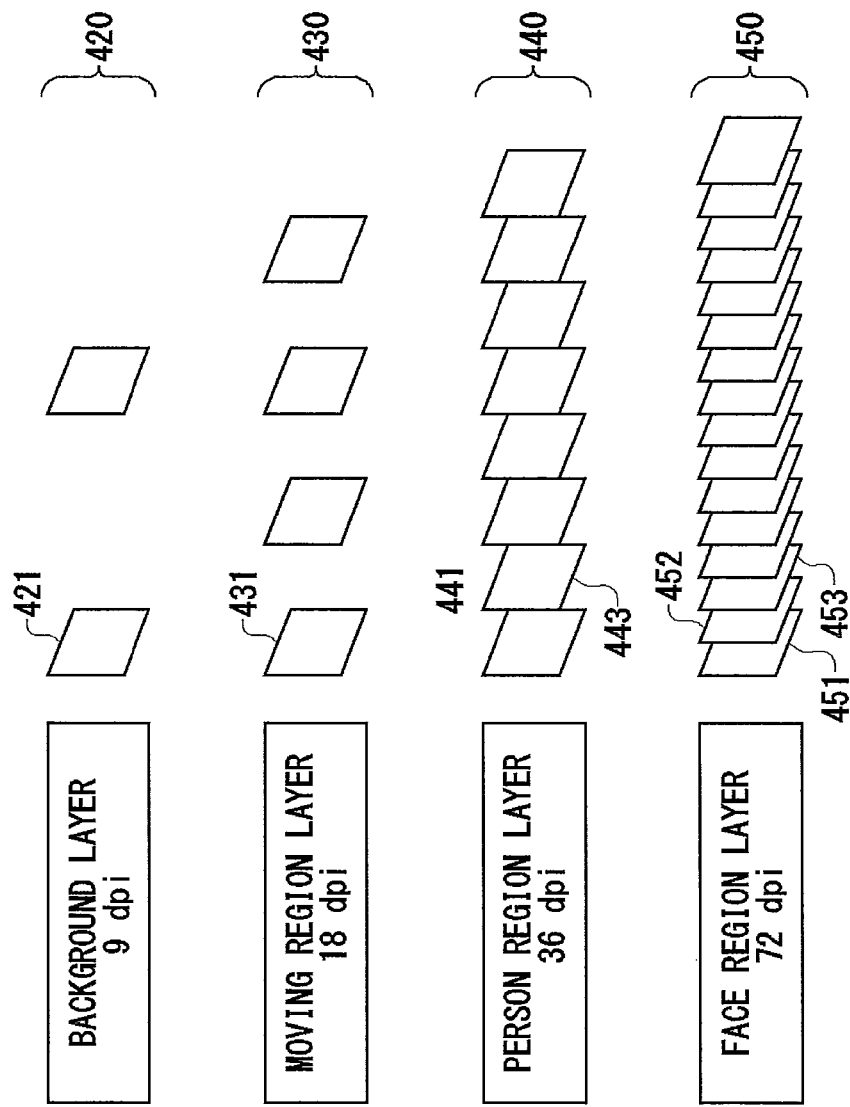
FIG. 4 shows an exemplary moving image output by the image processing apparatus 120.

FIG. 4 shows an exemplary moving image output by the image processing apparatus 120. To simplify the explanation, it is assumed that the captured moving image data obtained by the compressed moving image acquiring section 201 has a frame rate of 16 fps and that the moving image constituent images included in the captured moving image data have a resolution of 72 dpi.

The resolution ratio of the moving image constituent images included in the low-quality moving image 420, which have lower resolution than the resolution of the moving image constituent images 410 included in the captured moving image, is set at ⅛ in advance. The image quality degenerating section 281 generates 9-dpi moving image constituent images by thinning the pixels of the moving image constituent images included in the captured moving image to reduce the resolution to ⅛ of its original value.

Furthermore, the frame rate ratio of the low-quality moving image 420 after the image-quality reduction to the frame rate of the captured moving image is set at ⅛ in advance. The image quality degenerating section 281 generates a moving image with a frame rate of 2 fps by thinning the moving image constituent images included in the captured moving image to reduce the frame rate thereof to ⅛ of its original value. The image quality degenerating section 281 supplies the generated moving image to the inter-grade difference compressing section 282a.

Similarly, the resolution ratios and the frame rate ratios are designated in advance in association with the respective types of characteristics. The resolution ratio and the frame rate ratio may be set for each type of subject, which is an example of the type of characteristic. For example, the resolution ratio and the frame rate ratio are set at 1/4 for characteristic types that are moving subjects, the resolution ratio and the frame rate ratio are set at 1/2 for characteristic types that are bodies of people, and the resolution ratio and the frame rate ratio are set at 1/1 for characteristic types that are heads of people.

In this case, the image quality degenerating section 281 generates the moving image 430 with the frame rate of 4 fps and the moving image constituent image resolution of 18 dpi, and supplies this moving image 430 to the inter-grade difference compressing section 282$b$. The image quality degenerating section 281 generates the moving image 440 with the frame rate of 8 fps and the moving image constituent image resolution of 32 dpi, and supplies this moving image 430 to the inter-grade difference compressing section 282$c$. The inter-grade difference compressing section 282$d$ is provided with the moving image 450 with the frame rate of 16 fps and the moving image constituent image resolution of 72 dpi, from the input moving image quality control section 280. In this way, the image quality degenerating section 281 generates moving images with different frame rates and spatial resolutions corresponding to each type of subject.

Figure 5:
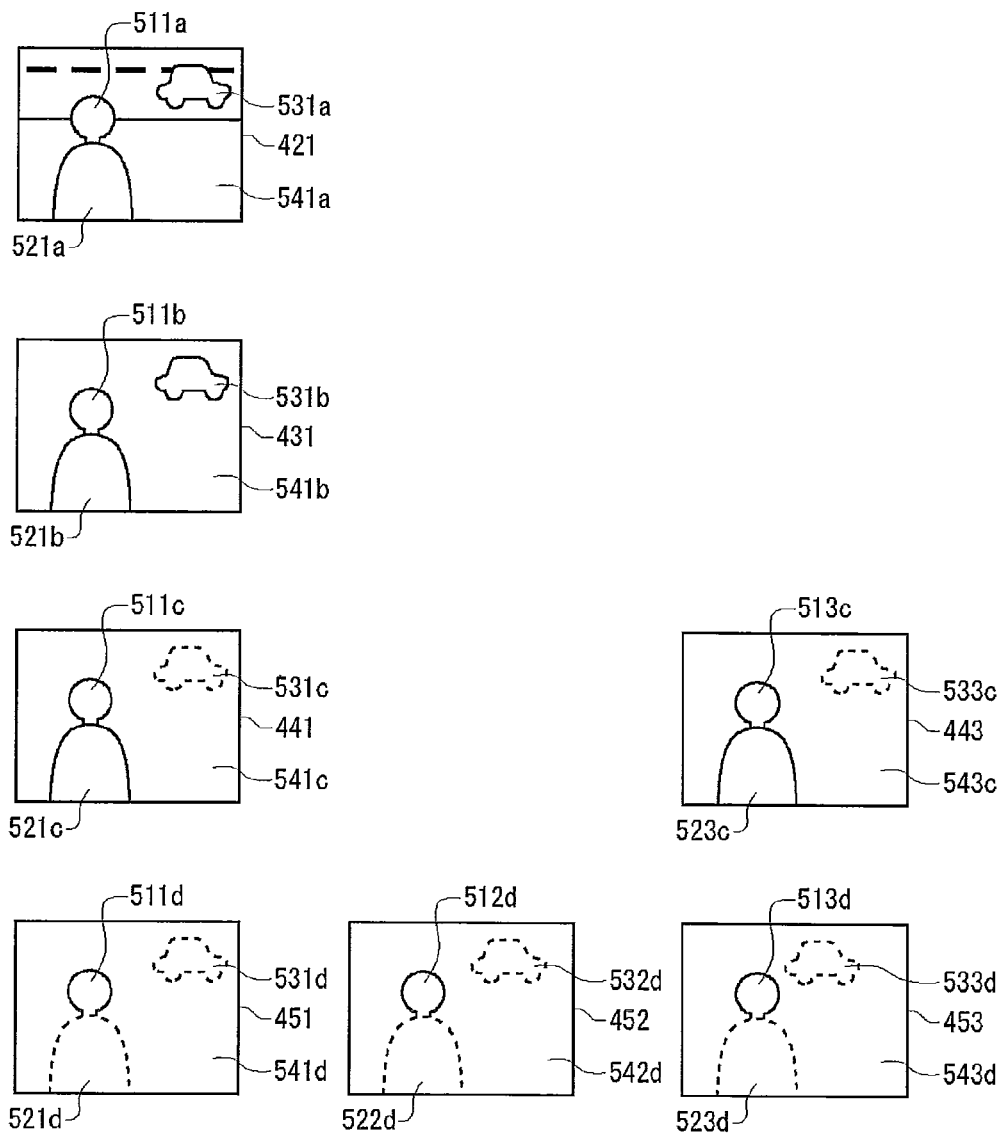
FIG. 5 shows examples of the content of moving image constituent images included in the moving images output by the inter-grade difference compressing section 282.

FIG. 5 shows examples of the content of moving image constituent images included in the moving images output by the inter-grade difference compressing section 282. The moving image constituent images 451 to 453 are included in the moving image 450 of FIG. 4. The moving image constituent images 441 and 443 are included in the moving image 440 of FIG. 4. The moving image constituent images 431 and 421 are included in the moving image 431 and the moving image 421, respectively.

The image quality degenerating section 281 generates the moving image constituent image 421, the moving image constituent image 431, the moving image constituent image 441, and the moving image constituent image 451 from the same single moving image constituent image included in the captured moving image. The image quality degenerating section 281 generates the moving image constituent image 443 and the moving image constituent image 453 from other moving image constituent images included in the captured moving image.

In the present embodiment, the characteristic region detecting section 203 detects the characteristic regions in the moving image constituent images included in the captured moving image to be a region 511 containing the head of a person, the region 521 containing the body of a person, and region 531 containing a moving object. Regions other than the region 511, the region 521, and the region 531 are set as the region 541. Each region included in the moving image constituent image 421, the moving image constituent image 431, the moving image constituent image 441, and the moving image constituent image 451 is distinguished by adding a, b, c, or d to the end of the reference numeral of the region.

In the same way, the characteristic region detecting section 203 detects the characteristic regions in the original moving image constituent images from which the moving image constituent image 443 and the moving image constituent image 453 were generated to be a region 513 containing the head of a person, the region 523 containing the body of a person, and region 533 containing a moving object. Regions other than the region 523 and the region 533 are set as the region 543. Each region included in the moving image constituent image 443 and the moving image constituent image 453 is distinguished by adding c or d to the end of the reference numeral of the region.

The characteristic region detecting section 203 detects the characteristic regions in the original moving image constituent image from which the moving image constituent image 452 was generated to be a region 512 containing the head of a person, the region 522 containing the body of a person, and region 532 containing a moving object. Regions other than the region 512, the region 522, and the region 532 are set as the region 542. Each region included in the moving image constituent image 453 is distinguished by adding d to the end of the reference numeral of the region. The region other than the characteristic regions in the moving image constituent image is labeled as the region 542$d$.

The inter-grade difference compressing section 282$a$ compresses the moving image constituent image 421 through inter-frame compression or intra-frame compression for each partial region of the moving image constituent image 421, as described in relation to FIG. 2. The inter-grade difference compressing section 282$b$ is set in advance to compress the moving image constituent image to have a resolution of 18 dpi, which is the amount allocated for moving objects.

More specifically, the image decoding section 292$b$ decodes the moving image constituent image compressed by the difference processing section 287$a$. The image enlarging section 293$b$ enlarges the decoded moving image constituent image until its resolution is 18 dpi, which is the resolution of the moving image constituent image acquired from the image quality degenerating section 281 by the inter-grade difference compressing section 282$b$. At this time, the image enlarging section 293$b$ may enlarge the moving image constituent image by copying the pixel value of nearby pixels, or by interpolation.

The pixel value changing section 291$b$ substitutes the pixel value of the region 541$b$, which is the region other than the characteristic regions of the moving image constituent image 431 acquired from the image quality degenerating section 281, with the pixel value of the corresponding region in the enlarged image generated by the image enlarging section 293$b$. The differential pixel image generating section 296$b$ is supplied with the image containing the substituted pixel value and with the enlarged image generated by the image enlarging section 293$b$. The differential pixel image generating section 296$b$ generates the differential pixel image based on the difference between the enlarged image and the image having the substituted pixel value in the region 541$b$. The difference value of the region 541$b$ in this differential pixel image is zero.

The differential pixel image generated by the differential pixel image generating section 296$b$ is compressed and encoded as described in relation to FIG. 2, and then supplied to the output section 207. By combining the region 531$b$ of the moving image constituent image 431 generated in this way with the image containing the enlarged image of the region 531$a$ in the moving image constituent image 421 compressed by the inter-grade difference compressing section 282$a$, a moving image constituent image is obtained in which at least the region 531$b$ containing the moving object has the prescribed resolution.

The following describes the process performed by the inter-grade difference compressing section 282$c$ on the moving image constituent image 431. Here, the inter-grade difference compressing section 282$c$ is set in advance to compress the moving image constituent image to have a resolution of 32 dpi, which is the amount allocated for the body of a person. The pixel value changing section 291$c$ substitutes the pixel values of the regions 541$c$ and 531$c$, which are the regions other than the characteristic regions to be included in the moving image constituent image 441 acquired from the image quality degenerating section 281, with the pixel value of the corresponding regions in the enlarged image generated by the image enlarging section 293c.

The differential pixel image generated by the differential pixel image generating section 296c is compressed and encoded as described in relation to FIG. 2, and then supplied to the output section 207. By combining the region 521c of the moving image constituent image 441 compressed in this way with the image containing the enlarged image of the regions 521a and 521b in the moving image constituent image 421, a moving image constituent image is obtained in which at least the region 521c containing the body of a person has the prescribed resolution.

The following describes the process performed by the inter-grade difference compressing section 282d on the moving image constituent image 451. Here, the inter-grade difference compressing section 282d is set in advance to compress the moving image constituent image to have a resolution of 64 dpi, which is the amount allocated for the head of a person. The pixel value changing section 291d substitutes the pixel values of the regions 541d, 521d, and 521d, which are the regions other than the characteristic regions to be included in the moving image constituent image 451 acquired from the input moving image quality control section 280, with the pixel value of the corresponding regions in the enlarged image generated by the image enlarging section 293d.

The differential pixel image generated by the differential pixel image generating section 296d is compressed and encoded as described in relation to FIG. 2, and then supplied to the output section 207. By combining the region 511d of the moving image constituent image 451 compressed in this way with the image containing the enlarged image of the regions 511a and 511b in the moving image constituent image 421 and 511c in the moving image constituent image 441, a moving image constituent image is obtained in which the region 511d containing the head of a person has the prescribed resolution.

In the above description, the pixel value changing sections 291b to 291d substitute the pixel values of regions other than the characteristic regions with the pixel value of the enlarged image, so that the difference value of at least the regions other than the characteristic regions in the differential pixel image is equal to zero. The regions other than the characteristic regions are regions that do not include the predetermined characteristic type, and therefore have a lower resolution than the characteristic regions. The difference value in the differential pixel image may be set to zero using other methods.

For example, the pixel value changing sections 291b to 291d may change the pixel values of the regions other than the characteristic regions of the moving image constituent images acquired from the image quality degenerating section 281 to be a prescribed value, and may also change the pixel value of the region image corresponding to the region 541 in the enlarged image to be the prescribed value. In this way as well, the difference value of the region 541 in the differential pixel image can be set to zero, so that the amount of information concerning the regions other than the characteristic regions can be substantially reduced.

In this way, the pixel value changing sections 291b to 291d generate, from the moving image constituent images, characteristic region images in which the pixel values of the regions other than the characteristic regions and the pixel values of the regions other than the characteristic regions in the enlarged images are replaced with the prescribed values. The differential pixel image generating sections 296 generate the differential pixel images based on the difference between the characteristic region images and the enlarged images, both sets having the substituted pixel values at the regions other than the characteristic regions.

The pixel value changing sections 291b to 291d may substitute the pixel values of the regions other than the characteristic regions in the moving image constituent images acquired from the image quality degenerating section 281 with pixel values of the corresponding regions in the enlarged images, which are obtained by enlarging the moving image constituent images supplied to an inter-grade difference compressing section 282 at a lower grade. In this way as well, the difference value in the differential pixel image can be set to substantially zero, so that the amount of information concerning the regions other than the characteristic regions can be substantially reduced.

Furthermore, the difference value in the differential pixel image can be set to substantially zero by adjusting the image quality of each region in the moving image constituent images using the input moving image quality control section 280, before inputting the moving image constituent images into the inter-grade difference compressing sections 282b to 282d. For example, the input moving image quality control section 280 may apply a low-pass filter to the regions other than the characteristic regions of the moving image constituent images, and may apply a low-pass filter to each characteristic region in the moving image constituent images, where these low-pass filters have predetermined characteristics according to the type of characteristic contained in the characteristic region.

The characteristic of the low-pass filter is desirably determined in advance such that the moving image constituent image to which the low-pass filter is applied has image characteristics that resemble those of the image enlarged by the image enlarging sections 293b to 293d, so that the difference value of the differential pixel image is nearly zero. More specifically, the low-pass filters desirably have characteristics according to the amount of thinning of the pixels by the image quality degenerating section 281, the quantization characteristic of the quantizing sections 298a to 298c, and the method of the enlargement by the image enlarging sections 293b to 293d.

As another alternative, the frequency domain image quality changing sections 299b to 299d can decrease the amount of information concerning the regions other than the characteristic regions. For example, the frequency domain image quality changing sections 299b to 299d set the conversion factor for the partial regions included in the regions other than the characteristic regions to be zero, from among the conversion factors quantized by the quantizing section 298b. The regions other than the characteristic regions may refer to the region 531c in the moving image constituent image 441 and the regions 521d and 531d in the moving image constituent image 451.

The following describes the method used by the difference processing sections 287b to 287d to compress the characteristic region images. This description shows an example in which the inter-grade difference compressing section 282d compresses the region 511d, but other regions, such as the regions 521c and 531b, may be compressed by the inter-grade difference compressing section 282b and the inter-grade difference compressing section 282c in the same way.

The difference processing section 287d receives, via the motion analyzing section 285d, image information concerning the partial regions that are compressing targets and image information concerning the partial regions that are difference obtaining targets. The difference processing section 287d further receives the partial region images of the enlarged images. The difference processing section 287b chooses a method for compressing the partial region images that are compressing targets. The methods chosen by the difference processing section 287b include: (i) a compression method based on the difference between the partial region images that are compressing targets and the partial region images that are difference obtaining targets (referred to hereinafter as "inter-frame compression"), (ii) a compression method based on the difference between the partial region images that are compressing targets and the partial region images in the enlarged images (referred to hereinafter as "inter-grade frame compression"), and (iii) a compression method that compresses the partial region images that are compressing targets using neither the partial region images that are difference obtaining targets nor the partial region images in the enlarged images (referred to hereinafter as "intra-frame compression").

For example, the difference processing section 287d gives priority to selecting a compression method from among the above three methods that achieves the highest compression rate. For example, the difference processing section 287d gives priority to selecting inter-frame compression or inter-grade frame compression over the intra-frame compression when the variance in the distribution of pixel values in the partial regions that are compressing targets is greater than a prescribed amount. This variance may be a half-value width in a histogram of the pixel values.

The difference processing section 287d gives priority to selecting the inter-grade frame compression over the inter-frame compression when the image difference between the partial regions that are compressing targets and the partial regions that are difference obtaining targets is greater than the image difference between the partial regions that are compressing targets and the corresponding partial regions in the enlarged images. The difference processing section 287d may select the compression method that can compress the images with the highest compression rate.

The following describes the process performed by the inter-grade difference compressing section 282d on the moving image constituent image 452. The inter-grade difference compressing section 282d may generate, as the image information indicating the images of the regions 542d and 532d, image information indicating that these regions are the same as the images of the same regions in other moving image constituent images included in the moving image 450, such as the moving image constituent image 451. In other words, the positional difference information changing section 290d sets the positional difference information for these regions as zero. As described above, the pixel value changing section 291d changes the pixel values of the regions 542d and 532d such that the difference of the pixel values in relation to the images at lower resolution layers is equal to zero. Here, the images at the lower resolution levels may be moving image constituent images at lower layers generated from the nearest moving image constituent image, such as the moving image constituent image 441.

When compressing the region 512d in the moving image constituent image 452, the difference processing section 287d selects the compression method having the highest compression rate from among the method of compressing the differential image between the region 512d and the region 511d and the method of compressing the differential image between the region 512d and the region 511c. The difference processing section 287d compresses the region 512d using the selected method.

The moving image constituent image 453 and the moving image constituent image 443 can be compressed by a combination of the compression methods described in relation to the moving image constituent image 452 and the compression methods described in relation to the moving image constituent image 441 and the moving image constituent image 451. Therefore, a detailed description of the processes performed by the inter-grade difference compressing section 282d and the inter-grade difference compressing section 282c on the moving image constituent image 453 and the moving image constituent image 443 is omitted.

In the above description, the pixel value changing sections 291b to 291d, the positional difference information changing sections 290b to 290d, and the frequency domain image quality changing sections 299b to 299d changed the conversion factors, the motion vectors, and the pixel values so as to set the image information of the regions other than the characteristic region to be equal to zero or substantially equal to zero. However, the pixel value changing sections 291b to 291d, the positional difference information changing sections 290b to 290d, and the frequency domain image quality changing sections 299b to 299d may hold the prescribed image information of the regions other than the characteristic regions at any timing. For example, the pixel value changing sections 291b to 291d do not replace the pixel values of the regions other than the characteristic regions at prescribed timings, so that images of the regions other than the characteristic regions can be provided at higher quality at the prescribed timings.

As described above, the characteristic region detecting section 203 detects a plurality of characteristic regions having different types of characteristics in the plurality of moving image constituent images included in the moving image. The pixel value changing section 291b then generates, for each moving image constituent image, one characteristic region image of the moving image constituent image by decreasing the resolution of a characteristic region having one type of characteristic, and also generates other characteristic region images of the moving image constituent image containing other characteristic types having higher resolutions than the aforementioned characteristic region image. The difference processing sections 287 generate a plurality of characteristic region difference images and a plurality of inter-characteristic region difference images, based on the plurality of characteristic region images generated from the plurality of moving image constituent images. The encoding sections 288 encode the characteristic region difference moving image that includes the plurality of characteristic region difference images, the inter-characteristic region difference moving image that includes the plurality of inter-characteristic region difference images, and the low-quality moving image that includes the plurality of low-quality images.

The image quality degenerating section 281 generates a plurality of low-quality images from the plurality of moving image constituent images selected at prescribed intervals, and also generates a plurality of characteristic region images from the plurality of moving image constituent images selected at intervals corresponding to the characteristic type, which are shorter than the prescribed intervals. The difference processing sections 287 generate the plurality of characteristic region difference images and the plurality of inter-characteristic region difference images from the plurality of low-quality images and the plurality of characteristic region images, which are generated from the plurality of moving image constituent images selected by the image quality degenerating section 281. When generating the plurality of characteristic region difference images and the plurality of inter-characteristic region difference images, the difference processing sections 287 may generate the characteristic region difference images or the inter-characteristic region difference images from the low-quality images or the characteristic region images generated from the moving image constituent images at a nearby timing, on a condition that characteristic region images or low-quality images having lower resolution than the characteristic region difference images or inter-characteristic region difference images generated from the same moving image constituent image are not present.

Figure 6:
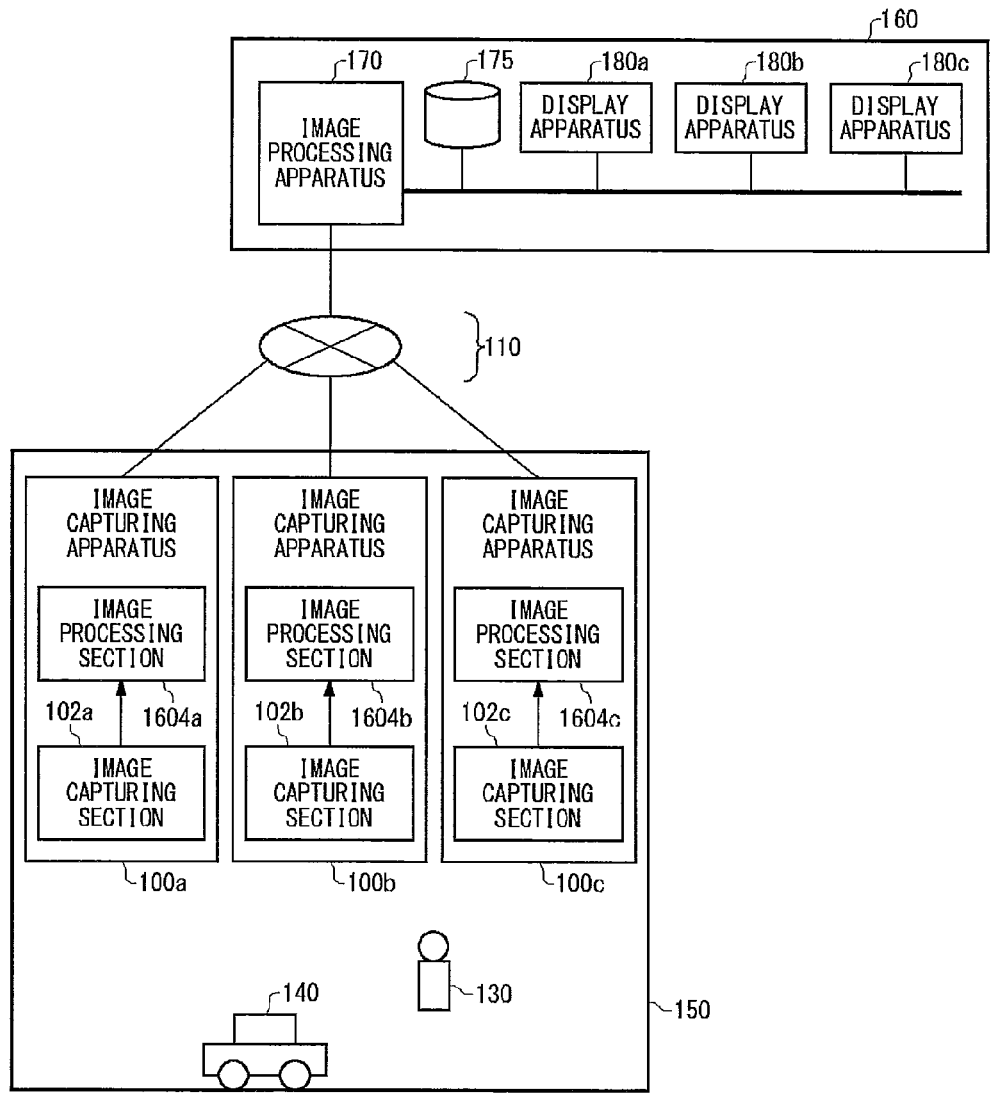
FIG. 6 shows one example of an image processing system 20 according to another embodiment.

FIG. 6 shows one example of an image processing system 20 according to another embodiment. The image processing system 20 according to the present embodiment has the same configuration as that of the image processing system 10 explained with reference to FIG. 1, except that the image processing apparatuses 120 are removed but instead image capturing apparatuses 100a to 100d include image processing sections 1604a to 1604d, which may be hereinafter collectively referred to as image processing sections 1604.

The image processing section 1604 includes the components of the image processing apparatus 120 except the compressed moving image acquiring section 201 and the compressed moving image decompressing section 202. The functions and operations of the respective components included in the image processing section 1604 may be substantially the same as those of the components included in the image processing apparatus 120, except that the components of the image processing section 1604 process a captured moving image captured by the image capturing section 102, not like the components of the image processing apparatus 120 process a captured moving image resulting from the decompression by the compressed moving image decompressing section 202. The image processing system 20 with this configuration can also achieve effects similar to those explained in connection with the image processing system 10 with reference to FIG. 1 to FIG. 5.

The image processing section 1604 may acquire, from the image capturing section 102, a captured moving image including a plurality of moving image constituent images represented in RAW format. The image processing section 1604 may detect one or more characteristic region(s) from each of the plurality of moving image constituent images represented in RAW format. The image processing section 1604 may compress the plurality of moving image constituent images in RAW format included in the acquired captured moving image, as they are in RAW format. At this time, the image processing section 1604 can compress the captured moving image by the compression method explained in connection with the operation of the image processing apparatus 120 with reference to FIG. 1 to FIG. 5.

The image processing apparatus 170 can acquire a plurality of moving image constituent images represented in RAW format, by decompressing a compressed moving image acquired from the image processing section 1604. The image processing apparatus 170 may perform color estimation (a coinciding process) on the plurality of moving image constituent images in RAW format obtained from the decompression, in the unit of region, i.e., in the unit of each region other than characteristic regions and in the unit of each of a plurality of characteristic regions separately. At this time, the image processing apparatus 170 may perform color estimation (a coinciding process) on the characteristic regions with higher accuracy than that on the region other than the characteristic regions.

The image processing apparatus 170 may apply a super-resolution process to the image of a characteristic region in the moving image constituent images resulting from the synchronization. The super-resolution process by the image processing apparatus 170 may be a process based on principal component analysis as described in Japanese Patent Application Publication No. 2006-350498, or a process based on the motion of an object as described in Japanese Patent Application Publication No. 2004-88615.

The image processing apparatus 170 may apply a super-resolution process separately to each object in a characteristic region. For example, when a characteristic region includes an image of a human face, the image processing apparatus 170 may apply a super-resolution process to each facial part such as eye, nose, mouth, etc., all of which are examples of objects. In this case, the image processing apparatus 170 stores learning data such as a model based on principal component analysis (PCA) as described in Japanese Patent Application Publication No. 2006-350498, for each facial part such as eye, nose, mouth, etc. The image processing apparatus 170 may apply a super-resolution process separately to the image of each facial part included in the characteristic region, by using the learning data selected for that facial part.

In this way, the image processing apparatus 170 can reconfigure the image of a characteristic region by principal component analysis (PCA). As an image reconfiguration technique and a learning technique for the image reconfiguration technique, the image processing apparatus 170 can use, in addition to the learning and image reconfiguration by principal component analysis (PCA), locality preserving projection (LPP), linear discriminant analysis (LDA), independent component analysis (ICA), multidimensional scaling (MDS), support vector machine (support vector regression), neural network, hidden Markov model, Bayes inference, maximum a posteriori probability estimation, iterative back projection, wavelet transform, locally linear embedding (LLE), Markov random field (MRF), etc.

The learning data may include, in addition to a model as described in Japanese Patent Application Publication No. 2006-350498, low-frequency components and high-frequency components in an image of an object, which are extracted from many sample images prepared for the object that category. Here, for each of a plurality of categories of objects, low-frequency components in images of the object may be clustered by K-means method or the like, so that the low-frequency components in the images of the object of each category may be clustered into a plurality of clusters. A representative low-frequency component such as the value of the median point of the cluster may be determined for each cluster.

The image processing apparatus 170 extracts low-frequency components from the image of an object included in a characteristic region in the moving image constituent images. The image processing apparatus 170 specifies, from clusters of low-frequency components extracted from sample images prepared for the object of the corresponding category, any cluster, the determined representative low-frequency component of which is a value matching any of the extracted low-frequency components. The image processing apparatus 170 specifies a cluster of high-frequency components that are associated with the low-frequency components included in the specified cluster. In this way, the image processing apparatus 170 can specify a cluster of high-frequency components correlated with the low-frequency components extracted from the object included in the moving image constituent images.

The image processing apparatus 170 may change the image of the object into an image with a higher image quality, by using a representative high-frequency component of the specified cluster of high-frequency components. For example, the image processing apparatus 170 may add, to the image of each object, a high-frequency component selected for the object based on a weight corresponding to the distance from the center of the object to the position of the processing target on the face. The representative high-frequency component may be generated by closed loop learning. Since the image processing apparatus 170 uses desired learning data selected for each object from learning data generated from learning about each object, the image processing apparatus 170 can sometimes make the object a high-quality image with a higher accuracy. Also in the image processing system 10 explained with reference to FIG. 1 to FIG. 5, the image processing apparatus 170 can apply the above-described super-resolution process to the images of characteristic regions.

In the super-resolution process based on principal component analysis as described in Japanese Patent Application Publication No. 2006-350498, the image of an object is expressed by principal component vectors and weighting coefficients. The data amount of the weighting coefficients and principal component vectors is significantly smaller than the data amount of the pixel data included in the image of the object. Hence, in the process of compressing the images of characteristic regions in a plurality of moving image constituent images acquired from the image capturing section 102, the image processing section 1604 may calculate weighting coefficients from the images of objects included in the characteristic regions. That is, the image processing section 1604 can compress the images of the objects included in the characteristic regions by expressing the images with principal component vectors and weighting coefficients. The image processing section 1604 may send the principal component vectors and weighting coefficients to the image processing apparatus 170.

In this case, the image processing apparatus 170 can reconfigure the images of the objects included in the characteristic regions by using the principal component vectors and weighting coefficients acquired from the image processing section 1604. Needless to say, the image processing section 1604 can compress the images of objects included in characteristic regions by using a model that expresses the objects with various characteristic parameters, instead of the model based on principal component analysis as described in Japanese Patent Application Publication No. 2006-350498.

Figure 7:
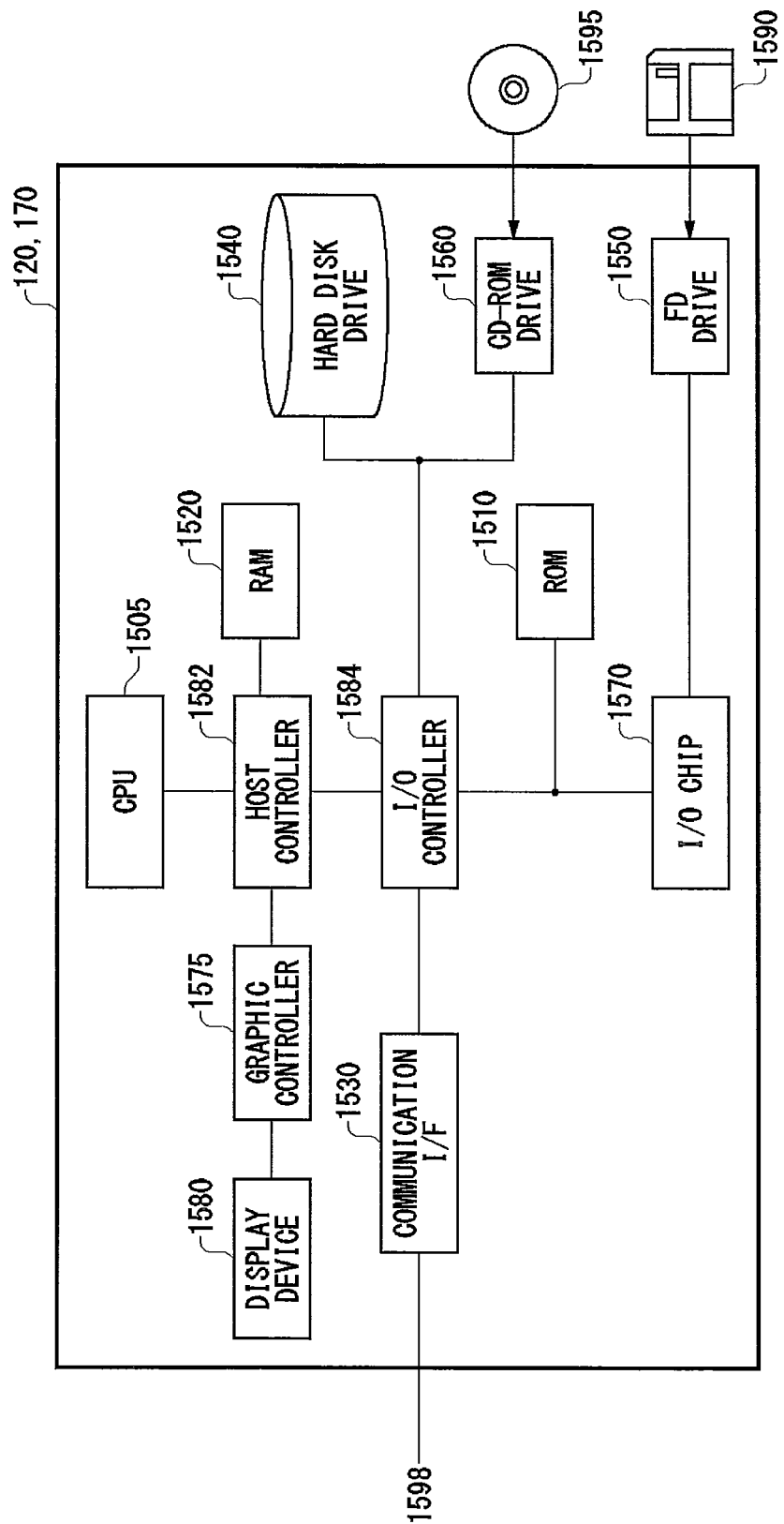
FIG. 7 shows one example hardware configuration of the image processing apparatus 120.

FIG. 7 shows one example hardware configuration of the image processing apparatus 120. The image processing apparatus 120 and the image processing apparatus 170 include a CPU peripheral section, an input/output section, and a legacy input/output section. The CPU peripheral section includes a CPU 1505, a RAM 1520, a graphic controller 1575, and a display device 1580, which are interconnected via a host controller 1582. The input/output section includes a communication interface 1530, a hard disk drive 1540, and a CD-ROM drive 1560, which are connected to the host controller 1582 via an input/output controller 1584. The legacy input/output section includes a ROM 1510, a flexible disk drive 1550, and an input/output chip 1570, which are connected to the input/output controller 1584.

The host controller 1582 connects the CPU 1505 and graphic controller 1575, which access the RAM 1520 at a high transfer rate, to the RAM 1520. The CPU 1505 operates based on programs stored in the ROM 1510 and the RAM 1520 to control each component. The graphic controller 1575 acquires image data generated by the CPU 1505 or the like in a frame buffer provided in the RAM 1520, and displays the image on the display device 1580. Instead, the graphic controller 1575 may include therein a frame buffer for storing image data generated by the CPU 1505 or the like.

The input/output controller 1584 connects the hard disk drive 1540, the communication interface 1530, and the CD-ROM drive 1560, which are relatively high-rate input/output devices, to the host controller 1582. The hard disk drive 1540 stores programs and data used by the CPU 1505. The communication interface 1530 connects with a network communication device 1598 to send or receive programs or data. The CD-ROM drive 1560 reads out a program or data from a CD-ROM 1595, and provides it to the hard disk drive 1540 and the communication interface 1530 via the RAM 1520.

The ROM 1510 and relatively low-rate input/output devices such as the flexible disk drive 1550 and the input/output chip 1570 are connected to the input/output controller 1584. The ROM 1510 stores a boot program executed when the image processing apparatus 120 is activated, or programs compliant to the hardware of the image processing apparatus 120. The flexible disk drive 1550 reads out a program or data from a flexible disk 1590, and supplies it to the hard disk drive 1540 or the communication interface 1530 via the RAM 1520. The input/output chip 1570 is a connection interface for input/output devices of various kinds, by means of the flexible disk drive 1550, a parallel port, a serial port, a keyboard port, a mouse port, etc.

A program executed by the CPU 1505 is provided from a user in a recording medium such as the flexible disk 1590, the CD-ROM 1595, an IC card, and the like. The program stored in the recording medium may be compressed or may not be compressed. The program in the recording medium is installed onto the hard disk drive 1540, read out into the RAM 1520 and executed by the CPU 1505. The program executed by the CPU 1505 causes the image processing apparatus 120 to function as the compressed moving image acquiring section 201, the compressed moving image decompressing section 202, the input moving image quality control section 280, the image quality degenerating section 281, and the intergrade difference compressing section 282 explained with reference to FIG. 1 to FIG. 6.

The program may be stored in an external recording medium. The recording medium may be the flexible disk 1590 or the CD-ROM 1595, or alternatively, an optical recording medium such as a DVD and a PD, a magneto-optical recording medium such as an MD, a tape medium, or a semiconductor memory such as an IC card. A memory device such as a hard disk, a RAM, or the like that is installed on a server system connected to a special-purpose communication network or the Internet may be used as a recording medium, so that the program may be provided to the image processing apparatus 120 via the network.

Although some aspects of the present invention have been described by way of the exemplary embodiments, it should be understood that those skilled in the art might make many changes and substitutions without departing from the spirit and the scope of the present invention which is defined only by the appended claims.

The invention claimed is:

1. An image processing apparatus comprising:
    a characteristic region detecting section that detects a characteristic region from an input image;
    an image generating section that generates, from the input image, a low-quality image which is of lower quality than the input image, and a characteristic region image which is of higher quality than the low-quality image at least at the characteristic region, the low-quality image having decreased resolution;
    a difference processing section that generates a characteristic region difference image indicating a difference between an image of the characteristic region in the characteristic region image and an enlarged image of the characteristic region in the low-quality image; and an encoding section that encodes the characteristic region difference image and the low-quality image; wherein the difference processing section generates the characteristic region difference image having a spatial frequency component in the characteristic region and a spatial frequency component with a decreased data amount in a region other than the characteristic region, the spatial frequency component being obtained by converting the difference between the enlarged image and the characteristic region image into a spatial frequency domain.

2. The image processing apparatus according to claim 1, wherein the characteristic region detecting section detects a plurality of characteristic regions having different characteristic types, from the input image, the image generating section generates, from the input image, one characteristic region image by decreasing the resolution in the characteristic region containing one type of characteristic and another characteristic region image containing another type of characteristic, the other characteristic region having resolution higher than the one characteristic region image at the characteristic region, the difference processing section generates (i) the characteristic region difference image in which the characteristic region containing the one type of characteristic has the spatial frequency component and the region other than the characteristic region containing the one type of characteristic has the spatial frequency component with a decreased data amount, the spatial frequency component being obtained by converting the difference between the enlarged image and the one characteristic image into the spatial frequency domain and (ii) an inter-characteristic region difference image in which the characteristic region containing the other type of characteristic has a spatial frequency component and the region other than the characteristic region having the other type of characteristic has the spatial frequency component with a decreased data amount, the spatial frequency component being obtained by converting, into the spatial frequency domain, the difference between the other characteristic region image and an enlarged image of the other characteristic region image in which the characteristic region is enlarged, and the encoding section encodes the characteristic region difference image, the inter-characteristic region difference image, and the low-quality image.

3. The image processing apparatus according to claim 2, wherein the difference processing section generates the characteristic region difference image having the spatial frequency component in the characteristic region having the one type of characteristic and the characteristic region having the other type of characteristic and having the spatial frequency component with a reduced data amount in the region other than the characteristic region having the one type of characteristic and the characteristic region having the other type of characteristic, the spatial frequency component being obtained by converting the difference between the enlarged image and the one characteristic image into the spatial frequency domain.

4. The image processing apparatus according to claim 3, wherein the characteristic region detecting section detects the plurality of characteristic regions having different characteristic types, from among a plurality of moving image constituent images included in a moving image serving as the input image, the image generating section generates, from each moving image constituent image, (i) one characteristic region image by decreasing the resolution at the characteristic region containing one type of characteristic and (ii) another characteristic region image having a higher resolution than the one characteristic region at the characteristic region containing another type of characteristic, the difference processing section generates a plurality of characteristic region difference images and a plurality of inter-characteristic region difference images from the plurality of characteristic region images generated by the image generating section from the plurality of moving image constituent images, and the encoding section encodes the characteristic region difference moving image including the plurality of characteristic region difference images, the inter-characteristic region difference moving image including the plurality of inter-characteristic region difference images, and a low quality moving image including the plurality of low-quality images.

5. The image processing apparatus according to claim 4, wherein the image generating section generates the plurality of low-quality images from the plurality of moving image constituent images selected at prescribed intervals and generates the plurality of characteristic region images from the plurality of moving image constituent images selected at intervals corresponding to the type of characteristic, which are shorter than the prescribed intervals.

6. The image processing apparatus according to claim 5, wherein the difference processing section generates the plurality of characteristic region difference images and the plurality of inter-characteristic region difference images from the plurality of low-quality images and the plurality of characteristic region images generated from the plurality of moving image constituent images selected by the image generating section.

7. The image processing apparatus according to claim 6, wherein the difference processing section, when generating the characteristic region difference images or the inter-characteristic region difference images, generates the characteristic region difference images or the inter-characteristic region difference images from the low-quality images or the characteristic region images generated from the moving image constituent images at a nearby timing, on a condition that characteristic region images or low-quality images having lower resolution than the characteristic region difference images or inter-characteristic region difference images generated from the same moving image constituent image do not exist.

8. The image processing apparatus according to claim 7, wherein the difference processing section includes:

a differential pixel image generating section that generates a differential pixel image having a difference value at the characteristic regions equal to the difference in pixel values between the characteristic region image and the enlarged image at the characteristic regions, but having no difference value at the region other than the characteristic regions; and a spatial frequency domain transforming section that generates the characteristic region difference images or the inter-characteristic region difference images by converting the differential pixel images into the spatial frequency domain for each partial region.

9. The image processing apparatus according to claim 8, wherein
the image generating section generates, from the input image, a characteristic region image in which the pixel value of the region other than the characteristic regions is replaced with the pixel value of the enlarged image, and
the differential pixel image generating section generates a differential pixel image based on the difference between the enlarged image and the characteristic region image in which the pixel value of the region other than the characteristic regions is replaced.

10. The image processing apparatus according to claim 8, wherein
the image generating section generates, from the input image, a characteristic region image in which the pixel value of the region other than the characteristic regions and the pixel value of the region other than the characteristic regions in the enlarged image are both replaced with a prescribed value, and
the differential pixel image generating section generates a differential pixel image based on the difference between the enlarged image and the characteristic region image, in which the pixel values of the regions other than the characteristic regions are replaced.

11. The image processing apparatus according to claim 7, wherein the difference processing section includes:
a differential pixel image generating section that generates differential pixel images indicating differences in pixel values between the characteristic region images and the enlarged images;
a spatial frequency domain transforming section that converts the differential pixel images into the spatial frequency range for each partial region; and
a frequency domain image quality changing section that generates the characteristic region difference images or the inter-characteristic region difference images by decreasing the data amount of the spatial frequency component of at least a portion of the partial region including the region other than the characteristic regions, from among the spatial frequency components of the plurality of partial regions that were converted into the spatial frequency domain by the spatial frequency domain transforming section.

12. The image processing apparatus according to claim 8, further comprising:
a difference obtaining target region determining section that determines difference obtaining target partial regions that are used to determine the difference between the partial region images in the characteristic region image and the difference obtaining target partial regions themselves, the difference obtaining target partial regions being partial regions in characteristic region images generated from a different moving image constituent image;
a positional difference information generating section that generates positional difference information indicating a positional difference of the partial regions serving as the difference obtaining targets, which are included in the region other than the characteristic region;
a positional difference information changing section that changes the positional difference information to indicate that a difference can be found between the partial regions included in the region other than the characteristic region that are at the same positions as each other; and
a motion encoding section that encodes the positional difference information, wherein
the differential pixel image generating section generates differential pixel images having a difference value at the partial regions included in the characteristic regions equal to the difference in pixel values between the partial region images and the difference obtaining target partial regions, but having no difference value at the region other than the characteristic regions.

13. The image processing apparatus according to claim 11, further comprising:
a difference obtaining target region determining section that determines partial regions, which are used to find a difference between the characteristic region images and the partial regions themselves, in the characteristic region images generated from a different moving image constituent image;
a positional difference information generating section that generates positional difference information indicating a positional difference of the partial regions serving as the difference obtaining targets, which are included in the region other than the characteristic region;
a motion encoding section that encodes the positional difference information; and
a positional difference information changing section that changes the positional difference information encoded by the motion encoding section to indicate that a difference can be found between the partial regions included in the region other than the characteristic regions that are at the same positions as each other.

14. An image processing method, comprising steps of:
detecting a characteristic region from an input image;
generating, from the input image, a low-quality image which is of lower quality than the input image, and a characteristic region image which is of higher quality than the low-quality image at least at the characteristic region, the low-quality image having decreased resolution;
generating a characteristic region difference image indicating a difference between an image of the characteristic region in the characteristic region image and an enlarged image of the characteristic region in the low-quality image; and
encoding the characteristic region difference image and the low-quality image; wherein
the step of generating a characteristic region difference image comprises a step of generating the characteristic region difference image having a spatial frequency component in the characteristic region and a spatial frequency component with a decreased data amount in a region other than the characteristic region, the spatial frequency component being obtained by converting the difference between the enlarged image and the characteristic region image into a spatial frequency domain.

15. A non-transitory computer readable medium storing therein a program for an image processing apparatus, the program causing the image processing apparatus to function as:
a characteristic region detecting section that detects a characteristic region from an input image;
an image generating section that generates, from the input image, a low-quality image which is of lower quality than the input image, and a characteristic region image which is of higher quality than the low-quality image at least at the characteristic region, the low-quality image having decreased resolution;

a difference processing section that generates a characteristic region difference image indicating a difference between an image of the characteristic region in the characteristic region image and an enlarged image of the characteristic region in the low-quality image; and an encoding section that encodes the characteristic region difference image and the low-quality image; wherein the difference processing section generates the characteristic region difference image having a spatial frequency component in the characteristic region and a spatial frequency component with a decreased data amount in a region other than the characteristic region, the spatial frequency component being obtained by converting the difference between the enlarged image and the characteristic region image into a spatial frequency domain.

16. The image processing apparatus according to claim 1, wherein the characteristic region detecting section detects the plurality of characteristic regions having different characteristic types, from among a plurality of moving image constituent images included in a moving image serving as the input image, and the image generating section generates the plurality of low-quality images from the plurality of moving image constituent images selected at prescribed intervals and generates the plurality of characteristic region images from the plurality of moving image constituent images selected at intervals corresponding to the type of characteristic, which are shorter than the prescribed intervals.

* * * * *